(12) United States Patent
Winarski

(10) Patent No.: US 11,159,327 B2
(45) Date of Patent: *Oct. 26, 2021

(54) BLOCKCHAIN AUGMENTATION OF A MATERIAL EXCHANGE FORMAT MXF FILE

(71) Applicant: Tyson York Winarski, Mountain View, CA (US)

(72) Inventor: Tyson York Winarski, Mountain View, CA (US)

(*) Notice: Subject to any disclaimer, the term of this patent is extended or adjusted under 35 U.S.C. 154(b) by 193 days.

This patent is subject to a terminal disclaimer.

(21) Appl. No.: 16/055,379

(22) Filed: Aug. 6, 2018

(65) Prior Publication Data

US 2020/0044855 A1  Feb. 6, 2020

(51) Int. Cl.
*H04L 9/32* (2006.01)
*H04N 21/854* (2011.01)
*H04L 9/08* (2006.01)

(52) U.S. Cl.
CPC .......... *H04L 9/3236* (2013.01); *H04L 9/0819* (2013.01); *H04N 21/85406* (2013.01); *H04L 2209/34* (2013.01); *H04L 2209/38* (2013.01)

(58) Field of Classification Search
CPC . H04L 9/3236; H04L 9/0819; H04L 2209/34; H04L 2209/38; H04N 21/85406
USPC ......................................................... 713/716
See application file for complete search history.

(56) References Cited

U.S. PATENT DOCUMENTS 7,007,166 B1 * 2/2006 Moskowitz ........... G06T 1/0021
380/46
9,495,366 B2 * 11/2016 Wetmore ............ H04L 63/0428
2007/0133951 A1 * 6/2007 Flecchia ................ H04N 19/44
386/346
2009/0144542 A1 * 6/2009 Wetmore ............ G06F 16/4393
713/156
2014/0133683 A1 * 5/2014 Robinson ............... H04R 27/00
381/303
2016/0219264 A1 * 7/2016 Delvaux .............. H04N 13/178
2017/0331635 A1 11/2017 Barinov et al.
(Continued)

FOREIGN PATENT DOCUMENTS

JP  2019032739 A  2/2019

OTHER PUBLICATIONS

Ghimire et al., "Using Blockchain for Improved Video Integrity Verification," doi: 10.1109/TMM.2019.2925961, pp. 108-121, Jan. 2020. (Year: 2020).*

(Continued)

*Primary Examiner* — Peter C Shaw
(74) *Attorney, Agent, or Firm* — The Winarski Firm, PLLC

(57) ABSTRACT

A Material eXchange Format (MXF) digital file generated by a digital electronic processor is disclosed that includes a generic container for a media file. The MXF file also includes a SDTI-CP (Serial Data Transport Interface-Content Package) compatible system item. The SDTI-CP compatible system item has a media file metadata and a blockchain hash digest information formed from the media file. The blockchain hash digest information of the media file may be a blockchain hash digest used to error check the media file. Alternatively, the blockchain hash digest information of the media file may be a link to a cloud-based blockchain hash digest used to error check the media file.

20 Claims, 22 Drawing Sheets

(56) References Cited

U.S. PATENT DOCUMENTS

| | | |
|---|---|---|
| 2018/0068091 A1 | 3/2018 | Gaidar et al. |
| 2018/0121635 A1* | 5/2018 | Tormasov et al. |
| 2018/0165364 A1* | 6/2018 | Mehta ................... G06F 16/212 |
| 2018/0357413 A1* | 12/2018 | Rivera .................... G06F 21/57 |
| 2019/0163685 A1* | 5/2019 | Aboutaam ............ G06F 21/602 |

OTHER PUBLICATIONS

Yatskiv et al., "Proof of Video Integrity Based on Blockchain", doi: 10.1109/ACITT.2019.8780097, 2019, pp. 431-434 (Year: 2019).*

IEEE, "IEEE Draft Standard Data Format for Blockchain Systems," in IEEE P2418.2/D1, May 2019, vol., No., pp. 1-31, Dec. 9, 2019. (Year: 2019).*

Gilmer et al., "Introduction and Overview of Advanced Authoring Format and Material Exchange Format," IEEE, doi: 10.5594/J15169, pp. 217-218, Jul.-Aug. 2004. (Year: 2004).*

Adam Hemlin Billström and Fabian Huss, Video Integrity Through Blockchain Technology, Degree Project in Electrical Engineering, Second Level Stockholm, Sweden 2017. https://people.kth.se/~maguire/DEGREE-PROJECT-REPORTS/170802-Adam_Hemlin_Billström_and_Fabian_Huss-with-cover.pdf.

* cited by examiner

| Byte 402 | Description 404 | Value (hex) 406 | Meaning 408 |
|---|---|---|---|
| 1 | Object Identifier | 06h | |
| 2 | UL size | 0Eh | |
| 3 | Designator | 2Bh | ISO, ORG |
| 4 | Designator | 34h | SMPTE |
| 5 | Registry Category Designator | 02h | Sets & packs |
| 6 | Registry Designator | Package, Picture, Sound, & Data Metadata Sets = 43h<br>Control data set = 63h<br>Package, Picture, Sound, & Data Blockchain Hash Digest Sets = 83h | Metadata sets (43h) = 1-byte tag, 2-byte length<br>Control set (63h) = 1-byte tag, 4-byte length<br>Blockchain Hash Digest set (83h) = 1-byte tag, 2-byte length |
| 7 | Structure Designator | 01h | Sets & Packs Registry |
| 8 | Version Number | 01h | Version 1 of the registry |
| 9 | Item Designator | 0Dh | Organizationally Registered |
| 10 | Organization | 01h | AAF Association |
| 11 | Structure | 03h | MXF Generic Container Keys |
| 12 | Structure Version | 01h | MXF-GC Version 1 |
| 13 | Item Type Identifier | 04h | CP-compatible system item |
| 14 | System Scheme Identifier | 01h | SDTI-CP, Version 1 |
| 15 | Metadata Element Identifier | 02-FFh | Package Metadata Set = 02h<br>Picture Metadata Set = 03h<br>Sound Metadata Set = 04h<br>Data Metadata Set = 05h<br>Control Data set = 06h<br>Package Blockchain Hash Digest Set = 1xh<br>Picture Blockchain Hash Digest Set = 2xh<br>Sound Blockchain Hash Digest Set = 3xh<br>Data Blockchain Hash Digest Set = 4xh |
| 16 | Metadata Block Count | xx | Number of metadata blocks in the Element (zero for the Control Data set) |

| Byte 402 | Description 404 | Value (hex) 406 | Meaning 408 |
|---|---|---|---|
| 1 | Object Identifier | 06h | |
| 2 | UL size | 0Eh | |
| 3 | Designator | 2Bh | ISO, ORG |
| 4 | Designator | 34h | SMPTE |
| 5 | Registry Category Designator | 02h | Sets & packs |
| 6 | Registry Designator | Package, Picture, Sound, Data, & Metadata Sets and Blockchain Hash Digest Sets = 43h<br>Control data set = 63h | Metadata and Blockchain Hash Digest Sets (43h) = 1-byte tag, 2-byte length<br>Control set (63h) = 1-byte tag, 4-byte length |
| 7 | Structure Designator | 01h | Sets & Packs Registry |
| 8 | Version Number | 01h | Version 1 of the registry |
| 9 | Item Designator | 0Dh | Organizationally Registered |
| 10 | Organization | 01h | AAF Association |
| 11 | Structure | 03h | MXF Generic Container Keys |
| 12 | Structure Version | 01h | MXF-GC Version 1 |
| 13 | Item Type Identifier | 04h | CP-compatible system item |
| 14 | System Scheme Identifier | 01h | SDTI-CP, Version 1 |
| 15 | Metadata Element Identifier | 02-FFh | Package Metadata Set = 02h<br>Picture Metadata Set = 03h<br>Sound Metadata Set = 04h<br>Data Metadata Set = 05h<br>Control Data set = 06h<br>Package Blockchain Hash Digest Set = 1xh<br>Picture Blockchain Hash Digest Set = 2xh<br>Sound Blockchain Hash Digest Set = 3xh<br>Data Blockchain Hash Digest Set = 4xh |
| 16 | Metadata Block Count | xx | Number of metadata blocks in the Element<br>(zero for the Control Data set) |

710

| Byte 712 | Description 714 | Value (hex) 716 | Meaning 718 |
|---|---|---|---|
| 15 | Metadata Element Identifier | 02-FFh | Package Metadata Set = 02h<br>Picture Metadata Set = 03h<br>Sound Metadata Set = 04h<br>Data Metadata Set = 05h<br>Control Data set = 06h<br><br>HASH DIGEST BASED ON SHA-256<br>Package Blockchain SHA-256 Hash Digest Set = 10h<br>Picture Blockchain SHA-256 Hash Digest Set - GOP in Stored Order = 20h<br>Picture Blockchain SHA-256 Hash Digest Set - GOP in Display Order = 21h<br>Picture Blockchain SHA-256 Hash Digests Set - GOP in Stored and Display Order = 22h<br>Picture Blockchain SHA-256 Hash Digest Set – I-Frames only = 23h<br>Sound Blockchain SHA-256 Hash Digest Set = 30h<br>Data Blockchain SHA-256 Hash Digest Set = 40h<br><br>HASH DIGEST BASED ON SHA-512<br>Package Blockchain SHA-512 Hash Digest Set = 18h<br>Picture Blockchain SHA-512 Hash Digest Set - GOP in Stored Order = 28h<br>Picture Blockchain SHA-512 Hash Digest Set - GOP in Display Order = 29h<br>Picture Blockchain SHA-512 Hash Digests Set - GOP in Stored and Display Order = 2Ah<br>Picture Blockchain SHA-512 Hash Digest Set – I-Frames only = 2Bh<br>Sound Blockchain SHA-512 Hash Digest Set = 38h<br>Data Blockchain SHA-512 Hash Digest Set = 48h<br><br>LINK TO CLOUD BASED HASH DIGEST<br>Package Blockchain Hash Digest Set Link = 14h<br>Picture Blockchain Hash Digest Set Link - GOP in Stored Order = 24h<br>Picture Blockchain Hash Digest Set Link - GOP in Display Order = 25h<br>Picture Blockchain Hash Digests Set Link - GOP in Stored and Display Order = 26h<br>Picture Blockchain Hash Digest Set Link – I-Frames only = 27h<br>Sound Blockchain Hash Digest Set Link = 34h<br>Data Blockchain Hash Digest Set Link = 44h<br><br>LINK TO CLOUD BASED HASH DIGEST AND ENCRYPTION KEY<br>Link to Package Blockchain Hash Digest Set and Encryption Key = 1Ch<br>Link to Picture Blockchain Hash Digest Set and Encryption Key - GOP in Stored Order = 2Ch<br>Link to Picture Blockchain Hash Digest Set - GOP in Display Order and Encryption Key r = 2Dh<br>Link to Picture Blockchain Hash Digests Set - GOP in Stored and Display Order and Encryption Key = 2Eh<br>Link to Picture Blockchain Hash Digest Set – I-Frames only and Encryption Key = 2Fh<br>Link to Sound Blockchain Hash Digest Set and Encryption Key = 3Ch<br>Link to Data Blockchain Hash Digest Set and Encryption Key = 4Ch |

FIG. 12

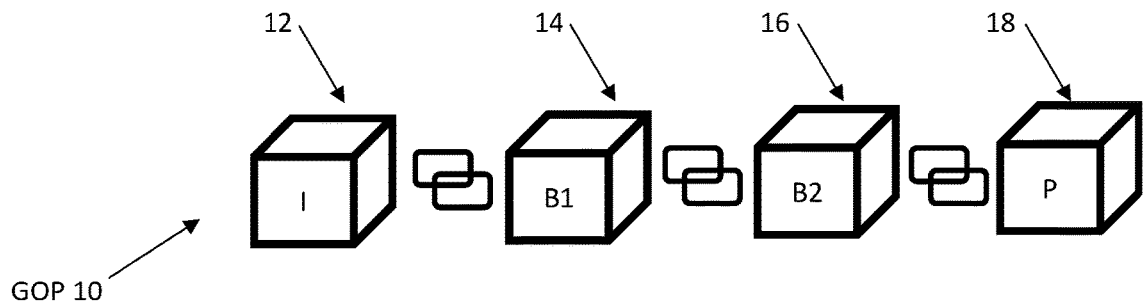

| GOP I FRAME BLOCK 12 | INFORMATION IN BLOCK:<br>*HASH DIGEST OF CURRENT BLOCK<br>*DATA: I FRAME |
|---|---|

| GOP B1 FRAME BLOCK 14 | INFORMATION IN BLOCK:<br>*HASH DIGEST OF PREVIOUS BLOCK (I FRAME) AND HASH DIGEST OF CURRENT BLOCK<br>*DATA: B1 FRAME |
|---|---|

| GOP B2 FRAME BLOCK 16 | INFORMATION IN BLOCK:<br>*HASH DIGEST OF PREVIOUS BLOCK (B1 FRAME) AND HASH DIGEST OF CURRENT BLOCK<br>*DATA: B2 FRAME |
|---|---|

| GOP P FRAME BLOCK 18 | INFORMATION IN BLOCK:<br>*HASH DIGEST OF PREVIOUS BLOCK (B2 FRAME) AND HASH DIGEST OF CURRENT BLOCK<br>*DATA: P FRAME |
|---|---|

FIG. 13

BLOCKCHAIN AUGMENTATION OF A MATERIAL EXCHANGE FORMAT MXF FILE

BACKGROUND

MXF, the Material eXchange Format, is a container format for professional digital video and audio/sound media which is defined by a set of SMPTE standards. SMPTE, the Society of Motion Picture and Television Engineers, was founded in 1916 as the Society of Motion Picture Engineers.

MXF is a "container" or "wrapper" format which supports a number of different streams of coded "essence", encoded in any of a variety of video and audio/sound compression formats, together with a metadata wrapper which describes the material contained within the MXF file. MXF has full timecode and metadata support, and is intended as a platform-agnostic stable standard for future professional video and audio/sound applications. MXF was developed to carry a subset of the Advanced Authoring Format (AAF) data model, under a policy known as the Zero Divergence Directive (ZDD). This theoretically enables MXF/AAF workflows between Non-Linear Editing (NLE) systems using AAF and cameras, servers, and other devices using MXF. There are 2 basic types of MXF clips: The first are those where the essence (media) is actually stored in the same file as the metadata that refers to it. These files are said to have internal essence. The second type is that where the essence is stored in separate files to the metadata, and these files are said to have external essence. In this case, the decoder first reads the metadata file, and that metadata points to the files in which the individual pieces of essence are stored.

XDCAM MXF from SONY™ is supported by ADOBE™ After Effects, ADOBE™ Premiere Pro, APPLE™ Final Cut Pro X, AUTODESK™ Smoke, AVID™, CAPELLA SYSTEMS™, DALET™, EVS™, IMAGINE COMMUNICATIONS CORPORATION™, OMNEON™, QUANTEL™, RHOZET™, SONY™ Vegas Pro, SORENSON™ Squeeze, TELESTREAM™ FlipFactory, GRASSVALLEY™ EDIUS, GRASSVALLEY™ K2, and MERGING TECHNOLOGIES™ VCube. P2 MXF by PANASONIC™ is supported by ADOBE™ After Effects, ADOBE™ Premiere Pro, APPLE™ Final Cut Pro X, AUTODESK™ Smoke, AVID™, DALET™, EVS™, GRASSVALLEY™ EDIUS, and GRASSVALLEY™ K2. IKEGAMI™ offers camcorders capable of recording in MXF wrapper using AVID™ DNxHD video encoding at 145 Mbit/second, as well as MPEG-2 video encoding at 50 Mbit/second 4:2:2 long-GOP and 100 Mbit/second I-frame. GOP stands for Group of Pictures, consisting of I (independently coded), P (predictively coded using one picture), and B (bipredictive coded using two pictures) frames. In 2010, CANON™ released its new lineup of professional file-based camcorders. The recording format used in these camcorders incorporates MPEG-2 video with bitrates up to 50 Mbit/second and 16-bit linear PCM audio/sound in what CANON™ has called XF codec. CANON™ claims that its flavor of MXF is fully supported by major NLE systems including ADOBE™ Premiere, APPLE™ Final Cut Pro X, AVID™ Media Composer, and GRASSVALLEY™ EDIUS.

MXF is used as the audio and video packaging format for Digital Cinema Package (DCP). It is also used regarding STANAG (NATO STANdardized AGreement) specification documents. The file extension for MXF files is ".mxf". The Macintosh file type code registered with APPLE™ for MXF files is "mxf", including a trailing space. The Internet would have "application/mxf". CinemaDNG (intended by ADOBE™ and others to be an open file format for digital cinema files) exploits MXF as one of its options for holding a sequence of raw video images. Blockchain technology is finding increasing use for insuring the error-free transfer of information. A hash algorithm takes input and converts it to, at a very high probability, a unique series of digits called a hash digest. The more digits in this hash digest, the less likely that there would be a collision, where different input had the same hash digest. The hash function demonstrates the avalanche effect, where a tiny change in the input, no matter how small, creates a significant change to the output digest. This patent disclosure melds the MFX format and Blockchain hash technology, to provide a standards-compatible implementation.

SUMMARY

The present invention is directed toward use of blockchain hash technology to secure the integrity of the MXF wrapped package. A Material eXchange Format (MXF) digital file generated by a digital electronic processor is disclosed that includes a generic container for a media file. The MXF file also includes a SDTI-CP (Serial Data Transport Interface-Content Package) compatible system item. The SDTI-CP compatible system item has a media file metadata and a blockchain hash digest information formed from the media file. The blockchain hash digest information of the media file may be a blockchain hash digest used to error check the media file. Alternatively, the blockchain hash digest information of the media file may be a link to a cloud-based blockchain hash digest used to error check the media file. In one embodiment, the blockchain hash digest of the media file is identified by a registry designator separate from a media metadata set registry designator. In another embodiment, the blockchain hash digest of the media file and the media file metadata share the same registry designator. In that embodiment, separate metadata element identifiers distinguish the blockchain hash digest of the media file from the media file metadata within the same registry designator. The media file may be a picture file formed of a Group Of Pictures (GOP) having I, P and B frames. In this instance, the blockchain hash digest may be formed from the frames of the Group of Pictures in a particular order such as having the I, P and B frames in a display order, the I, P and B frames are in a stored order, or based upon the I frames only. The Material eXchange Format (MXF) digital file may be transmitted electronically from a sender to a receiver over a communications link such as a satellite transmission link, a terrestrial wireless transmission link, or a distributed network communications link. An MXF file system manager located on the receiver error checks the Material eXchange Format (MXF) digital file by extracting the media file from the generic container and creating a hash of the media file and comparing it to the blockchain hash digest transmitted in the received Material eXchange Format (MXF) digital file. The blockchain hash digest of the media file can include a blockchain hash digest of a picture file, a blockchain hash digest of a sound file, and a blockchain hash digest of a data file. The SDTI-CP compatible system item may further include a blockchain hash digest of a package, a system metadata pack, a package metadata set, a picture metadata set, a sound metadata set, a data metadata set, and a control data set.

The present invention is also directed to a Material eXchange Format (MXF) file system manager for wrapping and unwrapping media essence formed of a picture, audio, and data. The system manager includes a metadata generating module that creates metadata sets for a package, a picture, audio, and data. The system manager also includes a cryptographic hash function module that creates a blockchain hash digest for the package, the picture, the audio, and the data. In addition, the system manager may also include an MXF wrapping module that creates a media essence container for the picture, the audio, and the data and wraps the essence container with the metadata and blockchain hash digest information to create a Material eXchange Format (MXF) File. In one embodiment, the blockchain hash digest information is the blockchain hash digest. In another embodiment, the blockchain hash digest information of the media file is a link to a cloud-based blockchain hash digest and the cryptographic hash function module stores the blockchain hash digest in a cloud-based storage location. The system manager may also have an MXF transmission system at a sender node and an MXF transmission system at a receiver node. The MXF transmission system is configured to send and receive the MXF file between the sender node and receiver node. The MXF file is transmitted electronically from the sender node to the receiver node over a communications link such as a satellite transmission link, a terrestrial wireless transmission link, and a distributed network communications link. The system manager may also include an error detection module that determines whether the picture, audio, and data contained within the media essence container is corrupted from transmission based upon a comparison of the blockchain hash digest wrapped within the MXF File to a new blockchain hash digest generated from the picture, audio, and data essence after it has been transmitted. The picture may be formed of a Group Of Pictures (GOP) having I, P and B frames. The blockchain hash digest of the picture may be formed from the frames of the Group of Pictures in a particular order such as having the I, P and B frames in a display order, the I, P and B frames are in a stored order, or based upon the I frames only.

The present invention is also directed to a method for digital transmission of a Material eXchange Format (MXF) File. The first step of the method is accessing a stored media file comprised of a picture, audio, and data. The next step of the method is creating a generic container to hold the media file. The next step of the method is generating metadata of the picture, audio, and data. The next step of the method is generating blockchain hash digest of the picture, audio, and data. The next step of the method is wrapping the generic container containing the media file, the metadata, and blockchain hash digest information into a Material eXchange Format (MXF) File. The next step of the method is transmitting the Material eXchange Format (MXF) File across a communications link from a sender node to a receiver node selected. The communications links may be a satellite transmission link, a terrestrial wireless transmission link, or a distributed network communications link. Additionally, the method may include the step of storing the blockchain hash digest in a cloud-based storage location and encrypting it with a link encryption key. In this embodiment, the blockchain hash digest information is a blockchain hash digest link to the blockchain hash digest stored in the cloud-based storage location. The link encryption key is wrapped in the Material eXchange Format (MXF) File. In another embodiment, the blockchain hash digest information is the blockchain hash digest. In one embodiment, the picture is formed of a Group Of Pictures (GOP) having I, P and B frames. In this instance, the blockchain hash digest may be formed from the frames of the Group of Pictures in a particular order such as having the I, P and B frames in a display order, the I, P and B frames are in a stored order, or based upon the I frames only.

The method also includes a process for performing an error check on the Material eXchange Format (MXF) File utilizing the blockchain hash digest stored in a cloud-based location. This process includes accessing the Material eXchange Format (MXF) File at the receiver node after it has been transmitted from the sender node and parsing the blockchain hash digest link and link encryption key from the Material eXchange Format (MXF) File. Next, the process includes accessing the blockchain hash digest from the cloud-based storage location utilizing the blockchain hash digest link and link encryption key. Additionally, the process includes parsing the media file in the generic container from the Material eXchange Format (MXF) File. The process also includes forming a new blockchain hash digest of the media file at the receiver node and comparing the new blockchain hash digest to the blockchain hash digest accessed from the cloud. The process allows access to the media file when the new blockchain hash digest matches the blockchain hash digest accessed from the cloud. The process denies access to the media file when the new blockchain hash digest does not match the blockchain hash digest accessed from the cloud. In addition, the process contacts the sender node to retransmit the Material eXchange Format (MXF) File to the receiver node when the new blockchain hash digest does not match the blockchain hash digest accessed from the cloud.

The method also includes an alternative process for performing an error check on the Material eXchange Format (MXF) File utilizing the blockchain hash digest contained within the Material eXchange Format (MXF) File. This process includes accessing the Material eXchange Format (MXF) File at the receiver node after it has been transmitted from the sender node. Next the process parses the blockchain hash digest from the Material eXchange Format (MXF) File and parses the media file in the generic container from the Material eXchange Format (MXF) File. Additionally, the process forms a new blockchain hash digest of the media file at the receiver node. Then, the process compares the new blockchain hash digest to the blockchain hash digest accessed from the cloud. The process allows access to the media file when the new blockchain hash digest matches the blockchain hash digest accessed from the cloud. The process denies access to the media file when the new blockchain hash digest does not match the blockchain hash digest accessed from the cloud. In addition, the process contacts the sender node to retransmit the Material eXchange Format (MXF) File to the receiver node when the new blockchain hash digest does not match the blockchain hash digest accessed from the cloud.

Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof, are best understood through the following description of the preferred embodiment of the present invention when read in conjunction with the accompanying drawings, wherein:

FIG. 4 illustrates a diagram of the key structure metadata element keys, of the SDTI-CP compatible system item, where the package, picture, sound, and data blockchain hash digest sets are identified by a registry designator separate from the package, picture, sound, and data metadata set registry designator, as well as separate metadata element identifiers;

FIG. 5 illustrates a diagram of the key structure metadata element keys, of the SDTI-CP compatible system item, where the package, picture, sound, and data blockchain hash digest sets and the package, picture, sound, and data metadata sets share the same registry designator; only separate metadata element identifiers distinguish them;

FIG. 12 illustrates a diagram of the augmented byte 15 of the key structure metadata element keys including SHA-256, SHA-512, and cloud technology;

FIG. 13 illustrates a blockchain of a Group-Of-Pictures along with tables depicting the data contained within each of the blockchain blocks;

DETAILED DESCRIPTION

While the invention has been shown and described with reference to a particular embodiment thereof, it will be understood to those skilled in the art, that various changes in form and details may be made therein without departing from the spirit and scope of the invention. The present invention is directed to a Material eXchange Format (MXF) File secured with blockchain hash digest technology. An MXF file includes a system item containing metadata, shown in FIGS. 1-5 and 12, along with generic containers that hold media, shown in FIGS. 6-7. Material eXchange Format (MXF) Files are discussed in length in the publication, which is hereby incorporated by reference in its entirety: Wells, Nick, ed. *The MXF Book, Introduction to the Material eXchange Format.* By Bruce Devlin and Jim Wilkinson. Amsterdam: Focal Press, 2006. Print. ISBN 13: 9780240806938.

Figure 1:
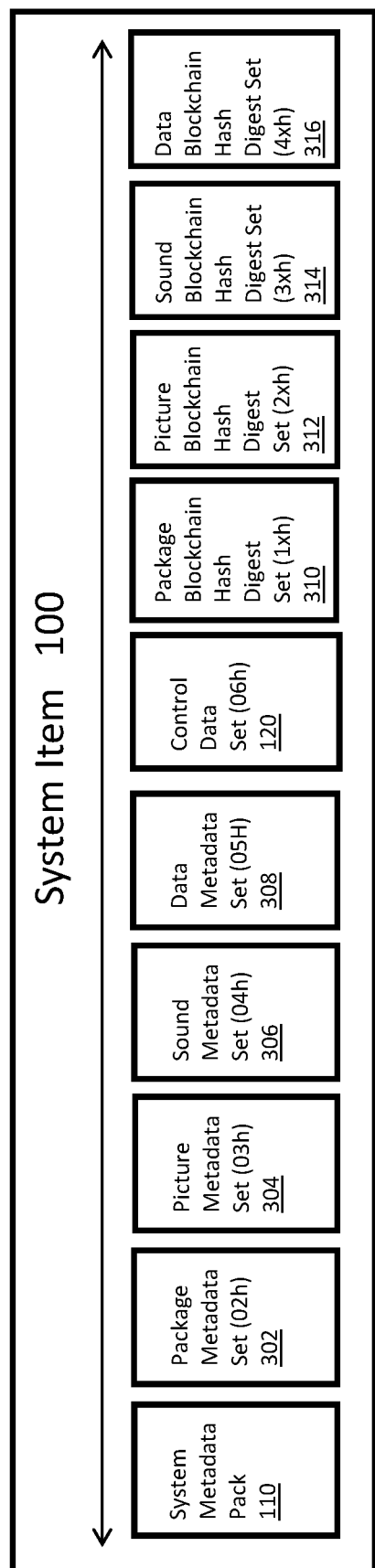
FIG. 1 illustrates a diagram of the SDTI-CP (Serial Data Transport Interface-Content Package) compatible system item and its elements.
Figure 2:
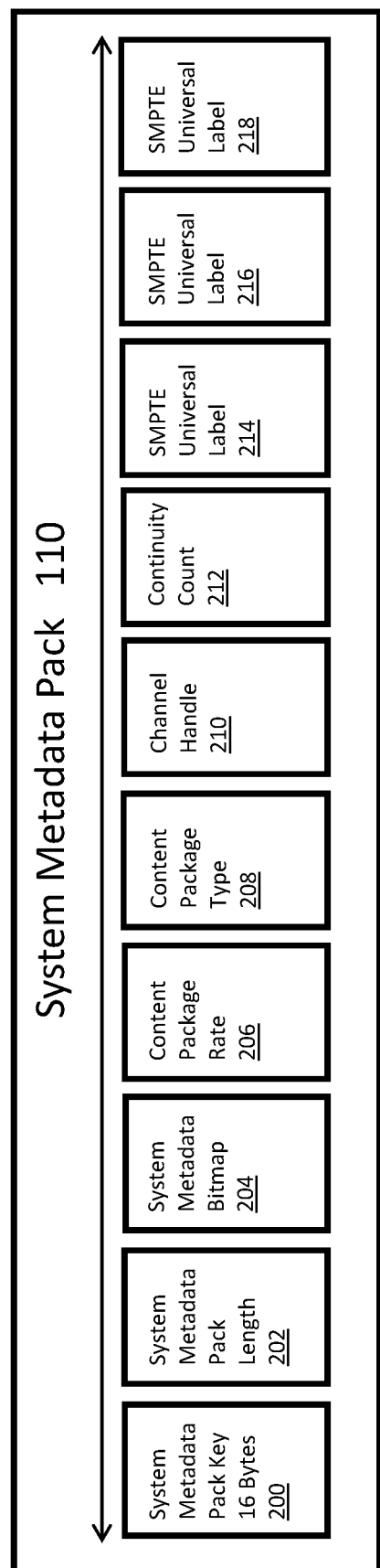
FIG. 2 illustrates a diagram of the system metadata pack of the SDTI-CP compatible system item.

FIG. 1 illustrates SDTI-CP compatible system item 100 that includes system metadata pack 110, which itself is further discussed in FIG. 2. System item 100 also includes package metadata set 302, picture metadata set 304, sound metadata set 306, data metadata set 308, control data set 120, package blockchain hash digest set 310, picture blockchain hash digest set 312, sound blockchain hash digest set 314, and data blockchain hash digest set 316. The structure of package metadata set 302, picture metadata set 304, sound metadata set 306, data metadata set 308, package blockchain hash digest set 310, picture blockchain hash digest set 312, sound blockchain hash digest set 314, and data blockchain hash digest set 316 are further discussed in FIG. 3.

FIG. 2 describes the system metadata pack 110, of the SDTI-CP compatible system item 100. System metadata pack 110 includes system metadata pack key 200, which is allocated 16 bytes of hexadecimal information. The system metadata pack length 202, system metadata bitmap 204, content package rate 206, and content package type 208 follow. Additionally, channel handle 210, continuity count 212, and SMPTE Universal labels 214, 216, and 218 conclude the description of the contents of the system metadata pack 110.

Figure 3:
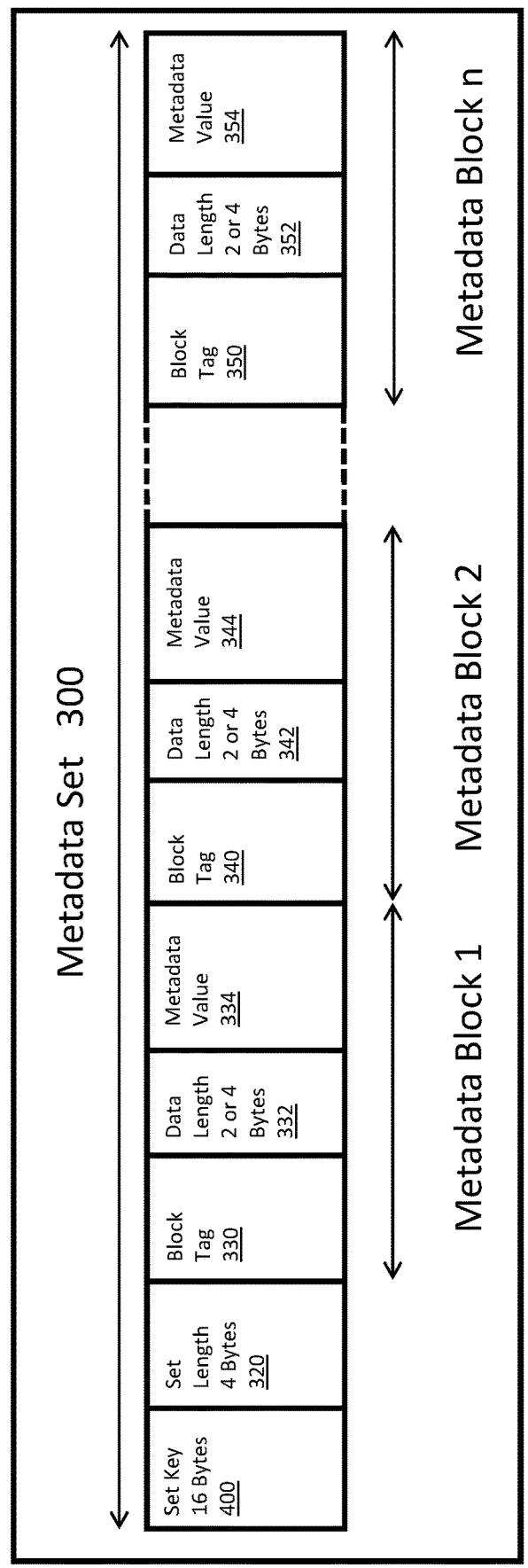
FIG. 3 illustrates a diagram of the structure for the package metadata set, picture metadata set, sound metadata set, data metadata set, package blockchain hash digest set, picture blockchain hash digest set, sound blockchain hash digest set, and data blockchain hash digest set of the SDTI-CP compatible system item.

FIG. 3 illustrates the metadata sets 300, of the SDTI-CP compatible system item 100, which define the common structure of package metadata set 302, picture metadata set 304, sound metadata set 306, data metadata set 308, package blockchain hash digest set 310, picture blockchain hash digest set 312, sound blockchain hash digest set 314, and data blockchain hash digest set 316. Metadata sets 300 begin with set key 400, which are each 16 bytes in length. The contents of set key 400 are further discussed in FIGS. 4 and 5. FIG. 4 illustrates a preferred embodiment of the contents 400A of set key 400. FIG. 5 illustrates an alternative embodiment of the contents 400B of set key 400. Following set key 400 is set length 320, which is allocated 4 bytes. Then a series of one or more metadata blocks ensues, each beginning with block tag 330, 340, 350, a data length of two to four bytes 332, 342, 352, and metadata values 334, 344, 354. It is metadata values 334, 344, 354 which are selectively repurposed to store blockchain hash digest information via a unique hexadecimal registry designator 83h and unique hexadecimal metadata element identifiers 1×h, 2×h, 3×h, and 4×h in FIG. 4, or selectively repurposed to store blockchain hash digest information solely via unique hexadecimal metadata element identifiers 1×h, 2×h, 3×h, and 4×h in FIG. 5.

The hash algorithm is typically the SHA-2 (Secure Hash Algorithm 2), which is a set of cryptographic hash functions designed by the United States National Security Agency (NSA). They are built using the Merkle-Damgård structure, from a one-way compression function itself built using the Davies-Meyer structure from a (classified) specialized block cipher. Cryptographic hash functions are mathematical operations run on digital data; by comparing the computed "hash" (the output from execution of the algorithm) to a known and expected hash value, a person can determine the data's integrity. For example, computing the hash of a downloaded file and comparing the result to a previously published hash result can show whether the download has been modified or tampered with. A key aspect of cryptographic hash functions is their collision resistance: nobody should be able to find two different input values that result in the same hash output. SHA-2 includes significant changes from its predecessor, SHA-1. The SHA-2 family includes six hash functions with digests (hash values) that are 224, 256, 384 or 512 bits: SHA-224, SHA-256, SHA-384, SHA-512, SHA-512/224, SHA-512/256. SHA-256 and SHA-512 are novel hash functions computed with 32-bit and 64-bit words, respectively. They use different shift amounts and additive constants, but their structures are otherwise virtually identical, differing only in the number of rounds. SHA-224 and SHA-384 are simply truncated versions of the first two, computed with different initial values. SHA-512/224 and SHA-512/256 are also truncated versions of SHA-512, but the initial values are generated using the method described in Federal Information Processing Standards (FIPS) PUB 180-4. SHA-2 was published in 2001 by the National Institute of Standards and Technology (NIST) a U.S. federal standard (FIPS). The SHA-2 family of algorithms are patented in U.S. Pat. No. 6,829,355, which is hereby incorporated by reference in its entirety. The United States has released this patent under a royalty-free license.

FIG. 4 illustrates key structure metadata element keys 400A of the SDTI-CP compatible system item 100 in a preferred embodiment of the invention. Key structure metadata element keys 400A are the contents of set key 400 shown in FIG. 3. In FIG. 4, the package, picture, sound, and data blockchain hash digest sets are identified by a registry designator separate from the package, picture, sound, and data metadata set registry designator, as well as separate metadata element identifiers. Column 402 lists the 16 bytes involved. Column 404 lists the descriptions of each of the 16 bytes. Column 406 then identifies the values used. Of interest in column 406, for byte 6, the registry designator byte, that package, picture, sound (audio), and data metadata sets are designated by the hexadecimal 43h, control data set is designated by the hexadecimal 63h, and the package, picture, sound, and data blockchain hash digest sets are designated by the hexadecimal 83h or any other convenient single-byte value other than a hexadecimal value already in use as a registry designator. Column 408 gives the meaning of the value in column 406, and of interest is the information for byte 15, the metadata identifier byte, that the package metadata set is designated by the hexadecimal 02h, the picture metadata set is designated by the hexadecimal 03h, the sound metadata set is designated by the hexadecimal 04h, data metadata set is designated by the hexadecimal 05h, the control data set is designated by the hexadecimal 06h, the package blockchain dash digest set is designated by the hexadecimal 1×h, the picture blockchain hash digest set is designated by the hexadecimal 2×h, the sound blockchain hash digest set is designated by the hexadecimal 3×h, and the data blockchain hash digest set is designated by the hexadecimal 4×h. In metadata element identifiers 1×h, 2×h, 3×h, and 4×h, "x" is a placeholder for a hexadecimal number between 0 and F. Furthermore, metadata element identifiers 1×h, 2×h, 3×h, and 4×h could be any other unique hexadecimal numbers of one-byte in length, to a maximum value of FF hexadecimal which is 11111111 binary (8 bits is one byte). Byte 15 is further embellished in FIG. 12 for FIG. 4.

FIG. 5 illustrates key structure metadata element keys 400B of the SDTI-CP compatible system item 100 in an alternative embodiment of the invention. Key structure metadata element keys 400B are the contents of set key 400 shown in FIG. 3. In FIG. 4, the package, picture, sound, and data blockchain hash digest sets are identified by a registry designator separate from the package, picture, sound, and data metadata set registry designator, as well as separate metadata element identifiers. In FIG. 5, the package, picture, sound, and data blockchain hash digest sets and the package, picture, sound, and data metadata sets share the same registry designator; only separate metadata element identifiers distinguish them. Column 402 lists the 16 bytes involved. Column 404 lists the descriptions of each of the 16 bytes. Column 406 then identifies the values used. Column 408 gives the meaning of the value in column 406. In key structure metadata element keys 400B shown in FIG. 5, metadata sets identified by registry designator 43h could be inclusive of the blockchain hash digest sets, making unnecessary the separate registry designator of 83h for blockchain hash digest sets as used in 400A. Thus, in byte 15 of 400B, the package blockchain hash digest set is identified solely by the metadata element identifier 1×h, the picture blockchain hash digest set is identified solely by the metadata element identifier 2×h, the sound blockchain hash digest set is solely identified by the metadata element identifier 3×h, and the data blockchain hash digest set is solely identified by the metadata element identifier 4×h. In metadata element identifiers 1×h, 2×h, 3×h, and 4×h, "x" is a placeholder for a hexadecimal number between 0 and F. Furthermore, metadata element identifiers 1×h, 2×h, 3×h, and 4×h could be any other unique hexadecimal numbers of one-byte in length. Byte 15 is further embellished in FIG. 12 for FIG. 5.

Key structure metadata element keys 400A of FIGS. 4 and 400B of FIG. 5 fall under the AAF (Advanced Authoring Format), per organization byte 10. Byte 11 indicates that key structure metadata element keys 400A and 400B represent MXF generic container keys, and Byte 12 indicates that key structure metadata element keys 400A and 400B are in the MXF GC (Generic Container) version 1. Byte 13 indicates a CP (Content Package) compatible system item 100, and Byte 14 indicates SDTI-CP, version 1 (Serial Data Transport Interface-Content Package).

Figure 6:
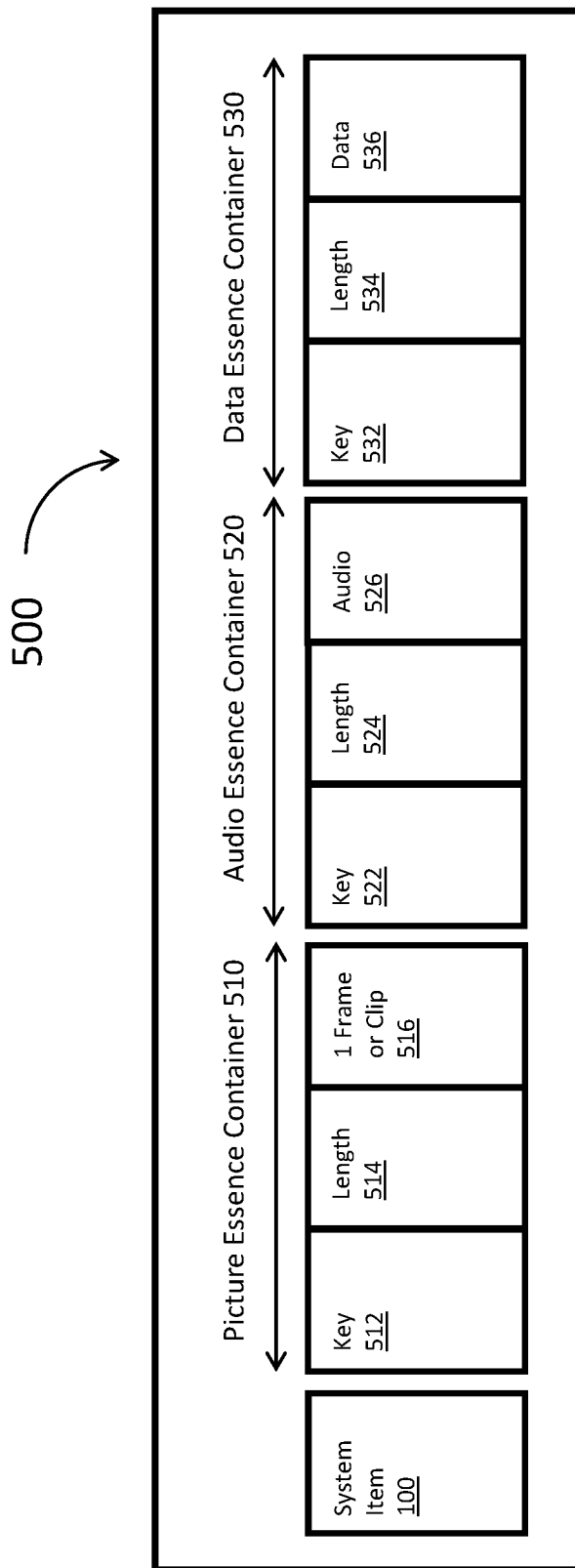
FIG. 6 illustrates a diagram of the wrapped picture, sound, and data.

FIG. 6 shows the wrap of system item 100, picture or video clip 516 within picture essence container 510, audio item 526 within audio essence container 520, and data item 536 within data essence container 530 to create the MXF file 500 that wraps picture, sound, and data. The picture essence container item 510 includes key 512, length 514, and one or more frames or clips of pictures or video 516. Pictures 516 may be in a JPEG (Joint Photographic Experts Group), JPEG-2000, TIFF (Tagged Image File Format), GIF (Graphics Interchange Format), PNG (Portable Network Graphics), or bitmap format, and the like. Video 516 may be in an MPEG (Motion Picture Experts Group) format; Long-GOP MPEG consisting of I, P, and B frames; MPEG-1; MPEG-2; MPEG-3; MPEG-4; MPEG-7; MPEG-21; MPEG-A; MPEG-B; MPEG-C; MPEG-D; MPEG-E; MPEG-V; MPEG-M; MPEG-U; MPEG-H; MPEG-DASH; H.264; iFrame (APPLE™) format; SMPTE VC-1; and the like. The audio essence container item 520 includes key 522, length 524, and audio 526. Audio 526 may be in the DOLBY™ AC-3 format, DOLBY™ AC-4 format, DOLBY™ TrueHD, DOLBY™ E, ALE (APPLE™ Lossless Encoder), ALAC (APPLE™ Lossless Audio Codec), AAC (Advanced Audio Encoding), DVD-A (DVD-Audio), AIFF (Audio Interchange File Format), MP3, and the like. Finally, data essence container item 530 includes key 532, length 534, and data 536. For brevity, only one picture item, one sound item, and one data item are shown in FIG. 5, but more could be included. Picture item 510 provides a generic container for a picture for video essence, clip 516. Sound item 520 provides a generic container for audio essence 526. Data item 530 provides a generic container for data essence 536. Data essence may be any type of digital file, such as software, executable code, database information, or other digital data. In FIG. 6, generic containers 510, 520, and 530 are shown having a single block of essence ("data"). The depiction of a single block of essence is merely exemplary. Generic containers 510, 520, and 530 may include partitioned essence as depicted in FIG. 7 discussed in detail below.

It should be noted that the MXF file 500 need not contain both pictures/video and sound/audio. It may only contain pictures/video, or may only contain sound/audio. Also, a single blockchain hash digest could be used solely for package metadata, or a single blockchain hash digest could be used only for picture metadata, or a single blockchain hash digest could be used only for audio metadata, or unique blockchain hash digests could simultaneously be used for package, picture, and audio metadata all in the same MXF wrapper.

Figure 7:
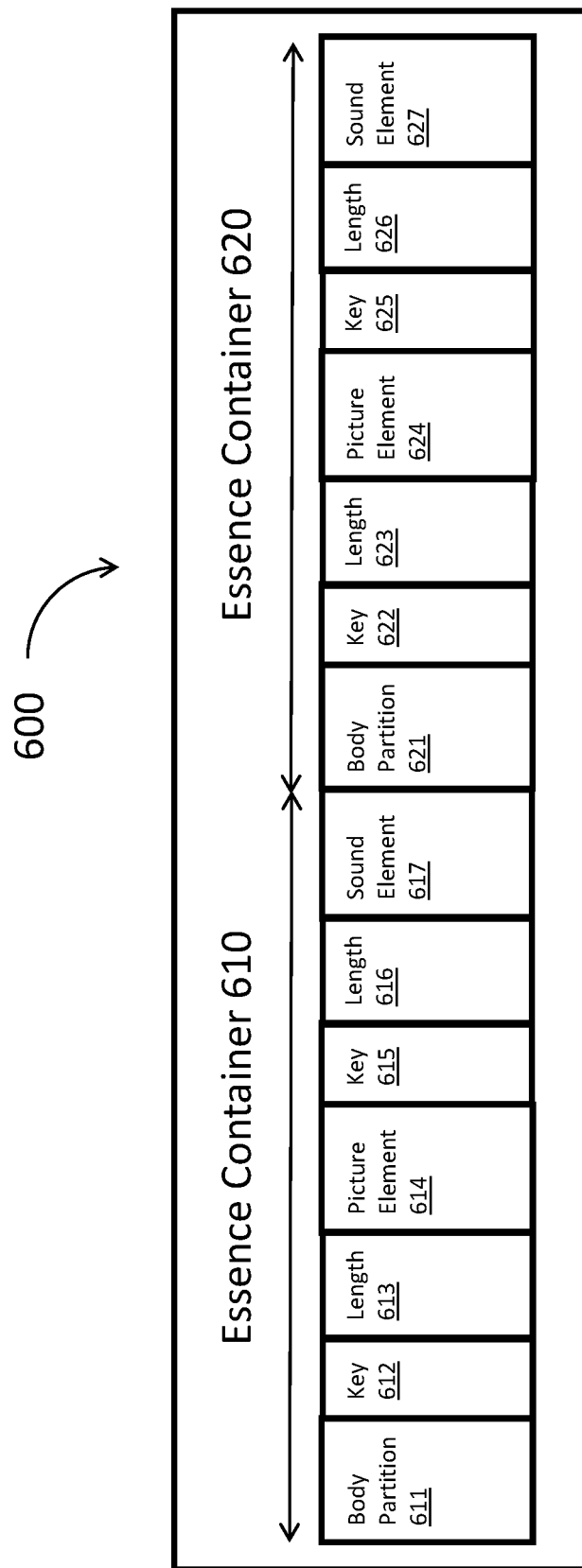
FIG. 7 illustrates a diagram of the partitioned picture and sound.

FIG. 7 shows partitioned picture and sound 600, with essence container 610 and essence container 620. Essence container 610 contains body partition 611, key 612, length 613, and picture element 614, as well as key 615, length 616, and sound element 617. Similarly, essence container 620 contains body partition 621, key 622, length 623, and picture element 624, as well as key 625, length 626, and sound element 627. For brevity, only two partitions are shown in FIG. 6, but more could be used in practice, or the picture and sound could not be partitioned at all as such partitioning is optional. Essence containers 610 and 620 may be used interchangeably within containers 510, 520, or 530 to create an MXF wrapped file.

Figure 8:
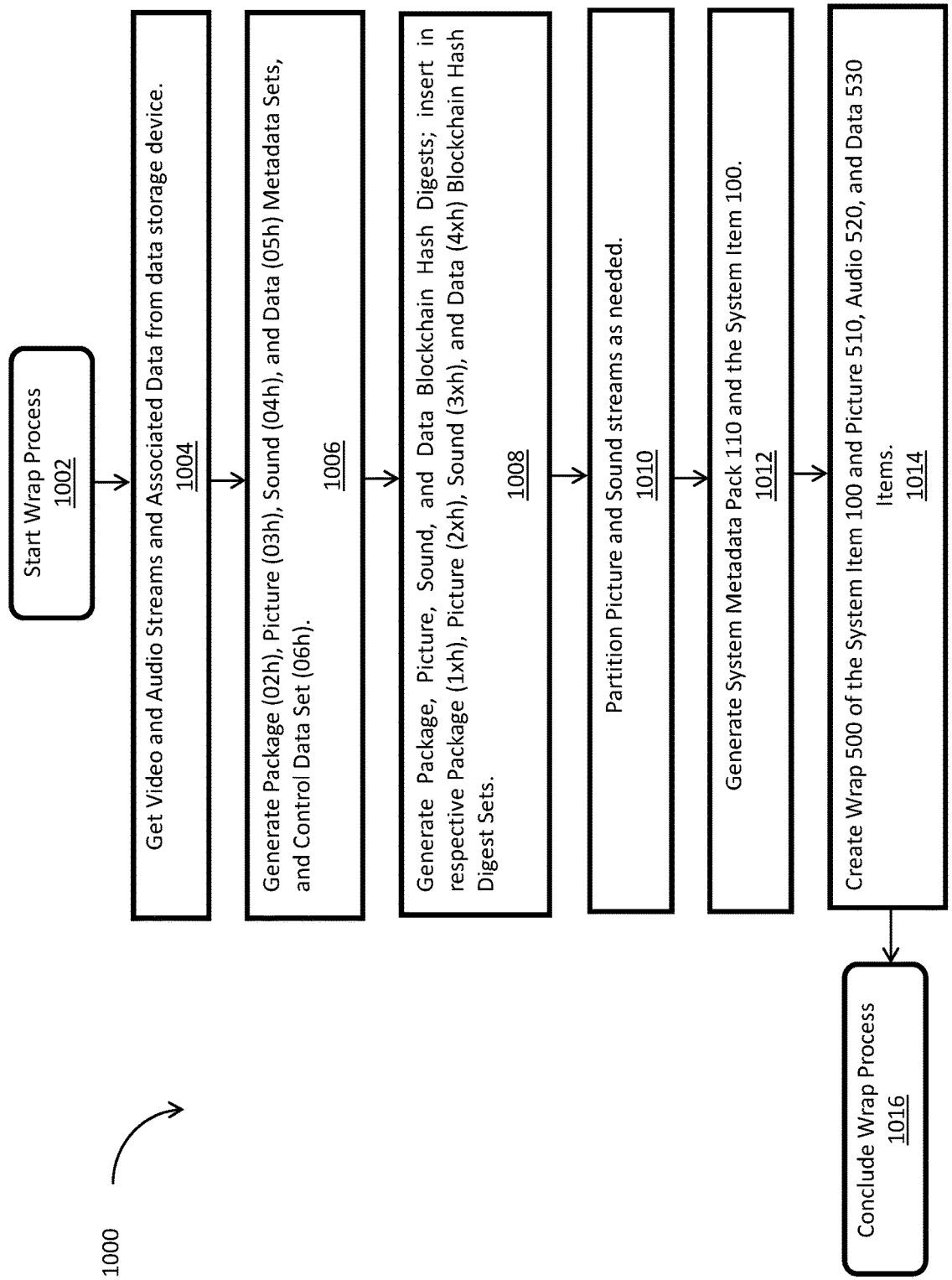
FIG. 8 illustrates a flowchart depicting the wrapping process.

FIG. 8 shows process 1000 for implementing an MXF wrapper to encapsulate video and audio streams with an MXF file system manager. The process begins at step 1002 and proceeds to step 1004 where an MXF file system manager acquires the video and audio streams and associated data from a data store. Then in step 1006, the process generates the system metadata pack 110; and package 302, picture 304, sound 306, data 308 metadata sets, and control data set 120. In step 1008, the MXF file system manager generates package, picture, sound, and data blockchain hash digests; and inserts these in the package 310, picture 312, sound 314, and data 316 blockchain hash digest sets, respectively. The package, picture, sound, and data blockchain hash digest sets are generated by the MXF file system manager by placing the respective blockchain hash digest in the metadata values 334, 344, and 354. In step 1010, the MXF file system manager optionally partitions the picture and sound streams as needed, such as with partitions 611 and 621. Then, in step 1012, the MXF file system manager generates system metadata pack 110 and the system item 100. Finally, in step 1014, the MXF file system manager wraps system item 100 and video (510), audio (520), and data (530) items to complete the wrap process, thus creating the MXF wrapped picture, sound, and data 500. For example, video content 510 may be in the form of a Group of Pictures. Group of Pictures (GOP) is a type of terminology related to video encoding. When generating the MXF wrapped video, sound and data, it is desirable that the GOP I, P, B is in "stored order 900," as shown in FIG. 10, within MXF wrapper 500.

Figure 9:
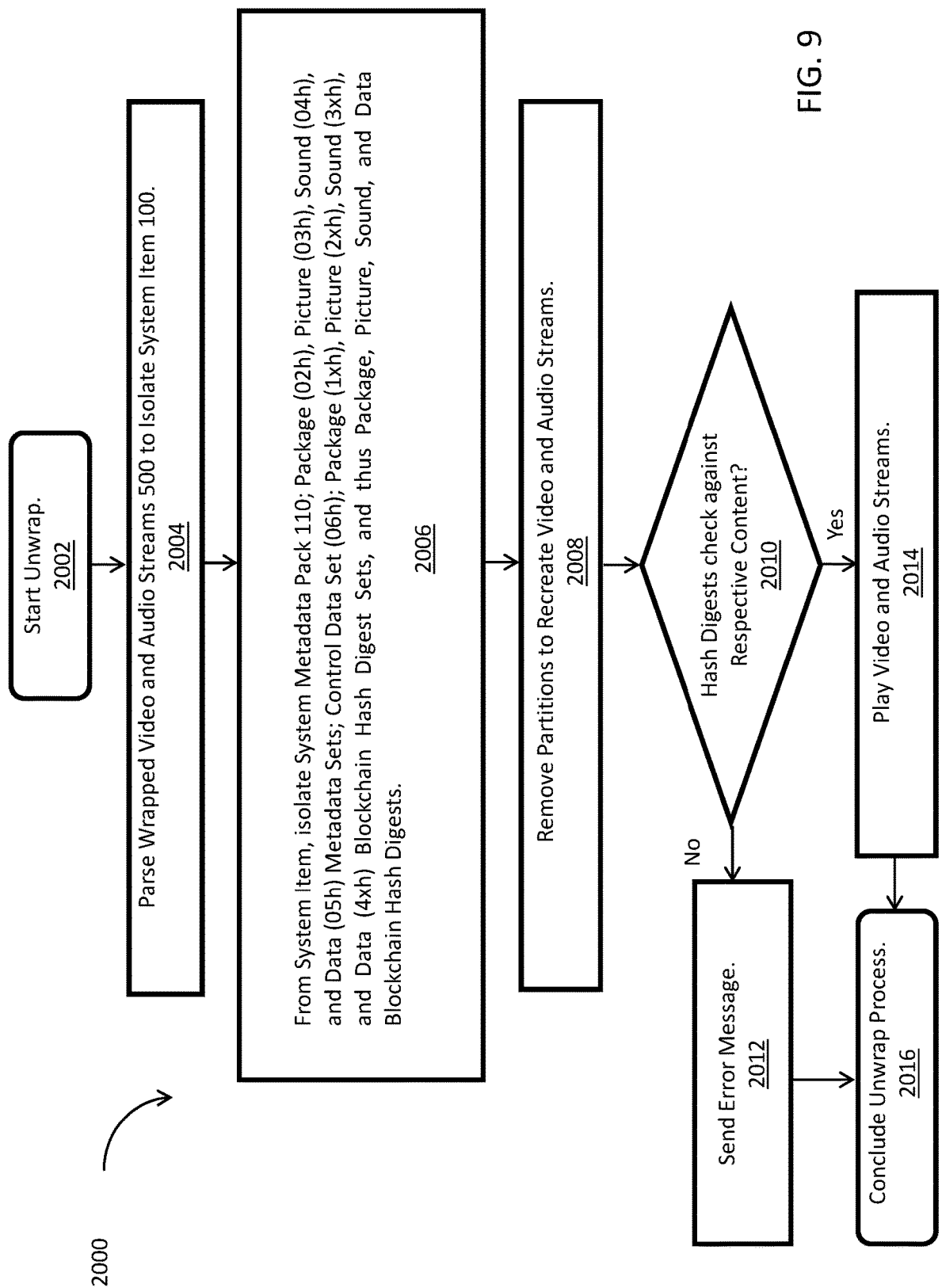
FIG. 9 illustrates a flowchart depicting the unwrapping process.
Figure 11:
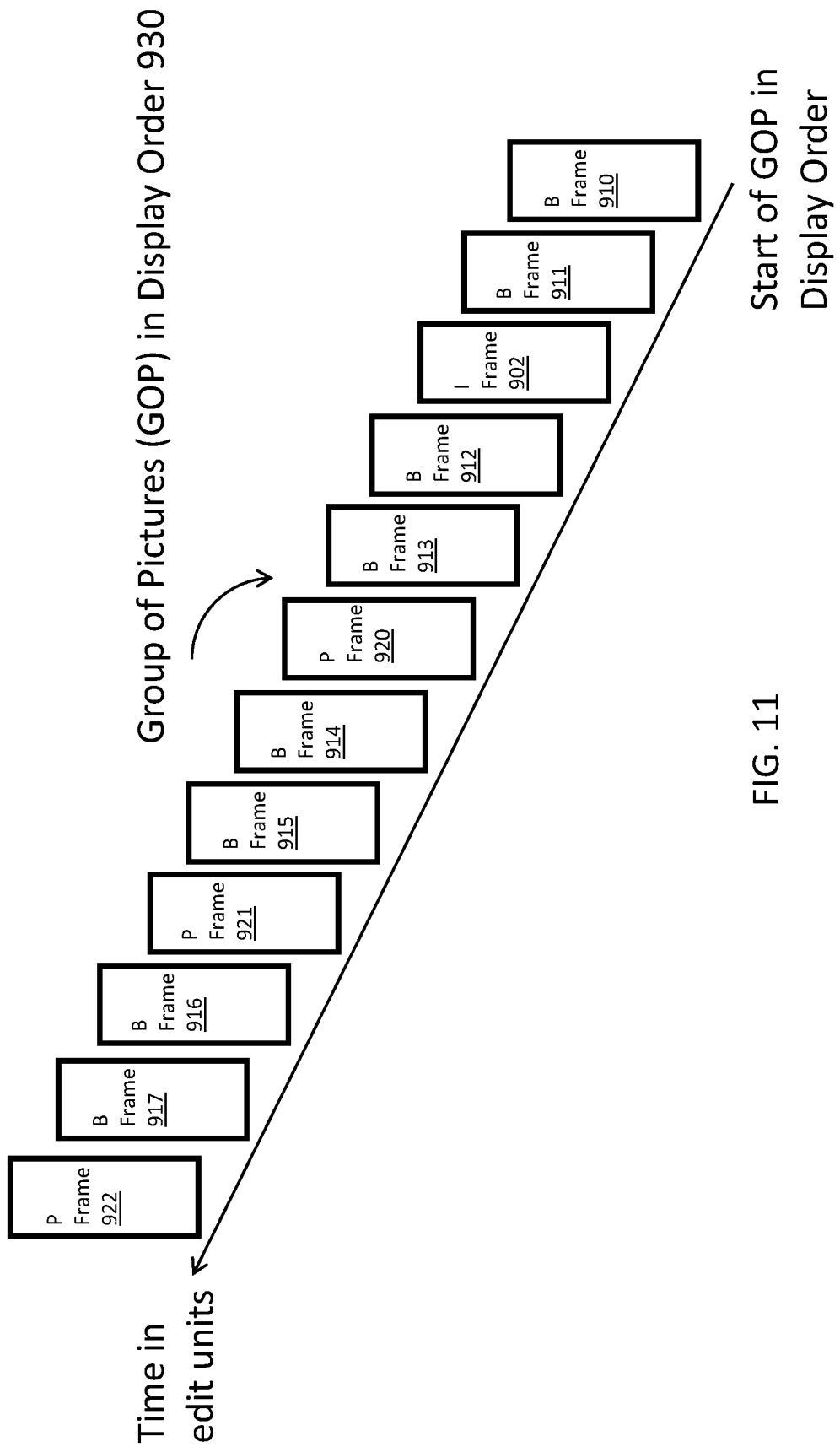
FIG. 11 illustrates an M=3, N=12 Group-Of-Pictures (GOP) I, P, B frames in displayed order.

FIG. 9 shows process 2000 for unwrapping the video and audio streams from the MXF wrapper with the MXF file system manager. The process begins at step 2002 and proceeds to step 2004 to parse the wrapped video and audio streams to isolate system item 100 with the MXF file system manager. In step 2006, from system item 100, the MXF file system manager isolates system metadata pack 110; metadata sets for the package 302, picture 304, sound 306, and data 308; blockchain hash digest sets for the package 310, picture 312, sound 314, and data 316, and thus package, picture, sound, and data blockchain hash digests; and the Control Data Set 120. If partitions exist, the MXF file system manager removes the partitions, such as 611 and 621, to recreate the video 510 and audio 520 streams in step 2008. At the conclusion of step 2008, the GOP I, P, B frames are in "display order 930," as shown in FIG. 11. In decision step 2010, MXF file system manager performs a check of the blockchain hash against the respective content by creating a separate blockchain hash of the respective content and comparing it to the blockchain hash contained within the MXF file. This check is done using the package blockchain hash digest for the entire package, the picture blockchain hash digest for the picture content, the audio blockchain hash digest for the audio content, and the data blockchain hash digest for the data content. If there is a mismatch detected by the MXF file system manager, an error message is sent in step 2012. If there is a successful match, the picture 510 and audio 520 streams are played in step 2014. One problem faced with the transmission of digital data is error free transmission. It is desirable to detect transmission errors when they occur. By transmitting the original media file in an essence container of the MXF file along with a hash digest of the media file, it is possible to compare the hash digest to the original media file to determine if there were any errors in the transmission of the original media file. As noted above, this comparison can be achieved by creating a hash digest of the transmitted media file and comparing it to the hash digest of the media file transmitted in the MXF file.

Figure 10:
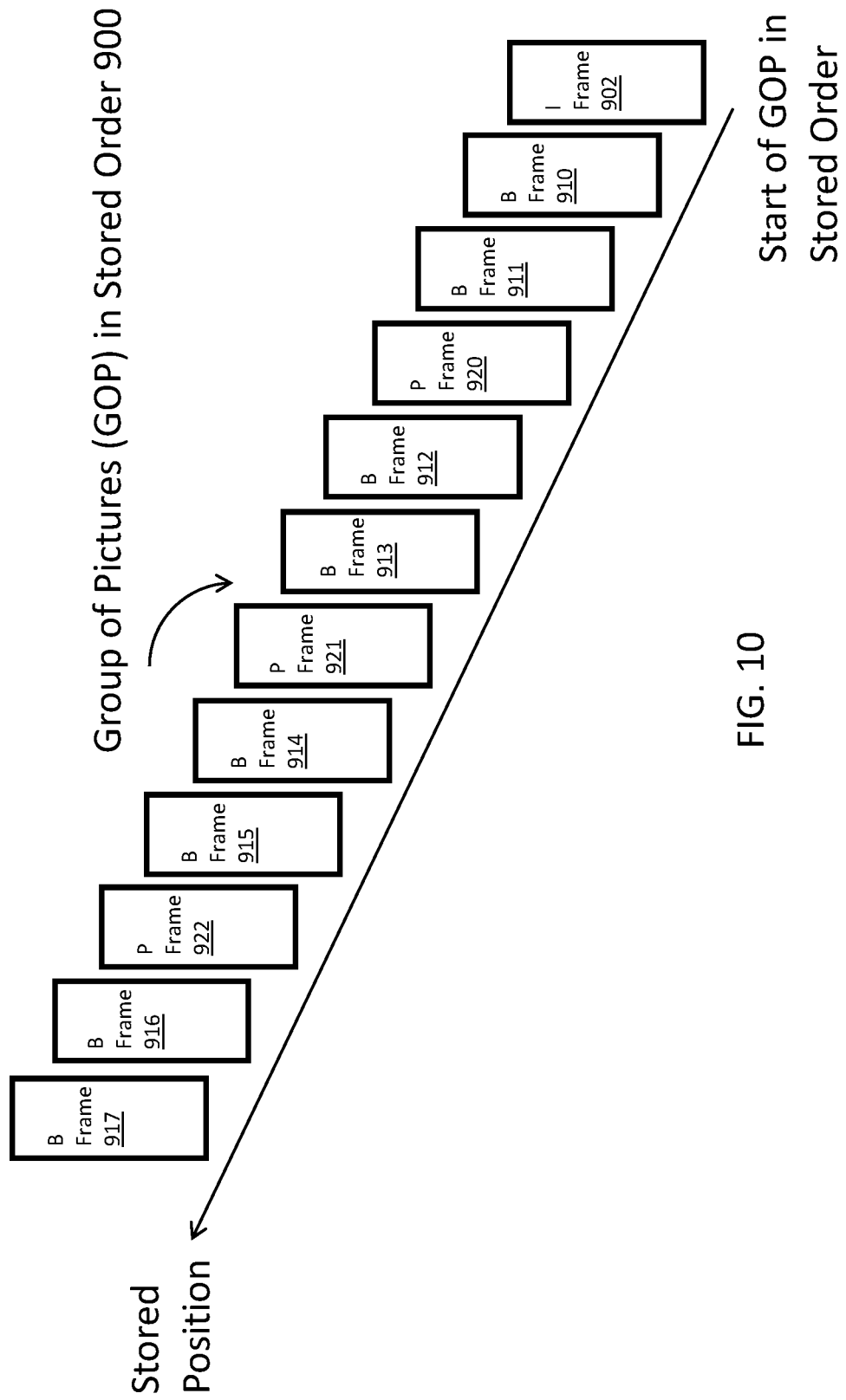
FIG. 10 illustrates an M=3, N=12 Group-Of-Pictures (GOP) I, P, B frames in stored order.

FIG. 10 illustrates an M=3, N=12 Group-Of-Pictures (GOP) I, P, B frames in stored order. In video coding, a group of pictures, or GOP structure, specifies the order in which intra- and inter-frames are arranged. The GOP is a collection of successive pictures within a coded video stream. Each coded video stream has successive GOPs, from which the visible frames are generated. Encountering a new GOP in a compressed video stream means that the decoder doesn't need any previous frames in order to decode the next ones, and allows fast seeking through the video. The GOP I, P, B stored structure is often referred by two numbers, for example, M=3, N=12. The first number tells the distance between two anchor frames (I or P). The second one tells the distance between two full images (I-frames), thereby designating the GOP size. In FIG. 10, for example, M=3, N=12, and the GOP 900 structure depicted is IBBPBBPBBPBB which has N=12 frames total in the GOP sequence. There is an I or P frame every M=3 frames in the repeating sequence IBBPBBPBBPBB IBBPBBPBBPBB IBBPBBPBBPBB . . . . This sequence is referred to as in the stored order, because it is led by the I frame 902. The example of M=3, N=12 is only for illustrative purposes and other GOP structures exist, such as M=3, N=15. GOP 900 is also referred to as closed, as no frames outside of this particular GOP affect the contents of this GOP and no frames within this GOP affect a GOP outside of it.

FIG. 11 illustrates an M=3, N=12 Group-Of-Pictures (GOP) I, P, B frames in displayed order. The GOP I, P, B structure 930 in FIG. 11 has the same I, P, and B frames as in FIG. 10, but the I, P, and B frames are now in display order. B frames 910 and 911, which had followed I frame 902 in the stored order, now precede I frame 902 in the display order. B frames 912 and 913, which had followed P frame 920 in the stored order, now precede P frame 920 in the display order. B frames 914 and 915, which had followed P frame 921 in the stored order, now precede P frame 921 in the display order. Finally, B frames 916 and 917, which had followed P frame 922 when in stored order, now precede P frame 922 in the display order.

FIG. 12 illustrates a diagram 710 of the augmented byte 15 of the key structure metadata element keys including SHA-256, SHA-512, and cloud technology. Column 712 identifies the byte listed in diagram 710, which is byte 15. Column 714 provides the description of the byte, which for byte 15 is the metadata element identifier. The value (hex) of byte 15 is listed in column 716. The value (hex) of byte 15 is 02-FFh. Column 718 provides the meaning of byte 15. Augmented byte 15 includes package metadata set designated by 02h, picture metadata set designated by 03h, sound metadata set designated by 04h, data metadata set designated by 05h, and control data set designated by 06h. Augmented byte 15 also includes a hash digest set of the package, picture, sound, and data information. This hash digest may be based upon hash function SHA-256, or hash function SHA-512. Alternatively, augmented byte 15 may not include the hash digest, but instead include a link to hash digest information stored in a remote data storage device located across a distributed network such as the Internet, more commonly referred to as "in the cloud."

The importance of stored order versus display order is that the blockchain hash of the GOP can be done either of two ways, by either the GOP 900 in stored order or the GOP 930 in the display order. The hash digest for SHA-256, which is the output of the hashing function, will have different values depending upon the order of the GOP frames in the stored order versus in the display order. Thus, in one embodiment, as depicted in FIG. 12 which provides more detail to the byte 15 shown in FIG. 4 and FIG. 5, the hash digest stored in picture blockchain SHA-256 hash digest Set 312 of system item 100 would be based on the "stored order 900" of the GOP I, P, and B frames and denoted, for example, by metadata element identifier 20h. In an alternate embodiment, the hash digest stored in picture blockchain SHA-256 hash digest set 312 of system item 100 would be based on the "display order 930" of the GOP I, P, and B frames and denoted, for example, by metadata element identifier 21h. In yet another embodiment, both hash digests would be present and the GOP could be checked in both the "stored order 900" and the "display order 930." If both hash digests are used, then either two picture blockchain hash digest sets 312 could be present in system item 100, FIG. 1, one designated 20h (stored order) and the other designated 21h (display order), or both the hash digests are present in the same picture blockchain SHA-256 hash digest set 312 and the metadata element identifier for this combination would be, for example, 22h. If only the I-frames of the GOP are hashed, to increase the performance of the hashing process by skipping the P and B frames, the resulting hash digest could be stored in picture blockchain SHA-256 hash digest set 312 designated by 23h. If only the I-frames are hashed, there is no difference between stored order or display order as the two orders are the identical for the I-frames. Also shown in FIG. 12 are the package blockchain SHA-256 hash digest set 310 designated by 10h, sound blockchain SHA-256 hash digest set 314 designated by 30h, and data blockchain SHA-256 hash digest set 340 designated by 40h.

In yet another embodiment, the use of hash function SHA-512 is supported, which is a stronger hash function than SHA-256. The hash digest stored in picture blockchain SHA-512 hash digest set 312 of system item 100 would be based on the "stored order 900" of the GOP I, P, and B frames and denoted, for example, by metadata element identifier 28h. In an alternate embodiment, the hash digest stored in picture blockchain SHA-512 hash digest set 312 of system item 100 would be based on the "display order 930" of the GOP I, P, and B frames and denoted, for example, by metadata element identifier 29h. In yet another embodiment, both hash digests would be present and the GOP could be checked in both the "stored order 900" and the "display order 930." If both hash digests are used, then either two picture blockchain hash digest sets 312 could be present in system item 100, FIG. 1, one designated 28h (stored order) and the other designated 29h (display order), or both the hash digests are present in the same picture blockchain SHA-512 hash digest set 312 and the metadata element identifier for this combination would be, for example, 2Ah. If only the I-frames of the GOP are hashed, to increase the performance of the hashing process by skipping the P and B frames, the resulting hash digest could be stored in picture blockchain SHA-512 hash digest set 312 designated by 2Bh. If only the I-frames are hashed, there is no difference between stored order or display order as the two orders are the identical for the I-frames. Also shown in FIG. 12 are the package blockchain SHA-512 hash digest set 310 designated by 18h, sound blockchain SHA-512 dash digest set 314 designated by 38h, and data blockchain SHA-512 hash digest set 340 designated by 48h.

In yet another embodiment, as depicted in FIG. 12, byte 15 is provided with a link to the hash digest stored in a cloud or other remote storage device. Picture blockchain hash digest link set 312 of system item 100 may be based on the "stored order 900" of the GOP I, P, and B frames and denoted, for example, by metadata element identifier 24h. A link to the hash digest stored in a cloud or other storage for picture blockchain hash digest link set 312 of system item 100 would be based on the "display order 930" of the GOP I, P, and B frames and denoted, for example, by metadata element identifier 25h. If both hash digests are used, for both "stored order 900" and the "display order 930," then separate links to two picture blockchain hash digest link sets 312 could be present in system item 100, FIG. 1, one designated 24h (stored order) and the other designated 25h (display order), or both the hash digests are available via one or two co-stored links for picture blockchain hash digest link set 312 and the metadata element identifier for this combination would be, for example, 26h. If only the I-frames of the GOP are hashed, to increase the performance of the hashing process by skipping the P and B frames, the resulting hash digest could be stored in a cloud or other storage in picture blockchain hash digest set 312 designated by 27h. If only the I-frames are hashed, there is no difference between stored order or display order as the two orders are the identical for the I-frames. Also shown in FIG. 12 are the package blockchain hash digest link set 310 designated by 14h, sound blockchain hash digest link set 314 designated by 34h, and data blockchain hash digest link set 340 designated by 44h. The use of this indirect addressing, where the blockchain hash digest link set sends the user to a cloud or other storage to obtain the actual hash digest, is to allow authenticating allowed users and blocking unauthorized users. The hashes used in combination with these cloud-based links may be any form of hash function such as SHA-256 or SHA-512.

In yet another embodiment, the media within the Material eXchange Format (MXF) File may be encrypted. There are various methods in which the media within the Material eXchange Format (MXF) File may be encrypted. For example, the entire package may be encrypted by a single encryption key. Alternatively, the picture, sound, and data may be separately encrypted by a different key. The package may also then be encrypted by a separate encryption key. All of these separate encryption keys may be stored within an encryption key set, which is wrapped within cloud-based blockchain encryption package 68. Cloud-based blockchain encryption package 68 is accessed utilizing a cloud-based link that is included within byte 15, as depicted in FIG. 12. In this embodiment, byte 15 includes a Link to package blockchain hash digest set and encryption key=1Ch. Byte 15 may also include a link to picture blockchain hash digest set and encryption key—GOP in stored order=2Ch. Byte 15 can also include a link to picture blockchain hash digest set—GOP in display order and encryption key r=2Dh. Alternatively, byte 15 may include a link to picture blockchain hash digest set—GOP in stored and display order and encryption key=2Eh. In a further embodiment, byte 15 may include a link to picture blockchain hash digest set—I-frames only and encryption key=2Fh. Then, byte 15 also has a link to sound blockchain hash digest set and encryption key=3Ch and a link to data blockchain hash digest set and encryption key=4Ch. Alternatively, all of the blockchain hash digest sets may be located collectively under a single link that points to a cloud-based storage location containing a cloud-based blockchain encryption package 68 that wraps all of the blockchain hash digest sets for the package, picture, sound, and data.

FIG. 13 illustrates a blockchain of a Group-Of-Pictures 10 along with tables depicting the data contained within each of the blockchain blocks 12, 14, 16, and 18. A blockchain is a continuously growing list of records, called blocks, which are linked and secured using cryptography. Each block typically contains a cryptographic hash of the previous block, a timestamp, and transaction data. Group-Of-Pictures blockchain 10 includes a genesis block 12 that includes an I frame of a GOP as data. Block 12 also includes a hash digest of itself. Typically, a blockchain block will also have a hash digest of the previous block in the blockchain. However, as block 12 is the genesis block, i.e. the first block in the blockchain, it includes a hash digest of itself only. The next block in the blockchain, block 14, includes a B frame of a GOP as data. As block 14 has the first B frame as data, that B frame is identified as B1. Block 14 includes a hash digest of block 12 and a hash digest of itself. Block 16 also includes a B frame as data. As the B frame in block 16 is the second B frame in the blockchain 10, it is labelled at B2. Block 16 also includes a hash digest of block 14 and a hash digest of itself. Block 18 includes a P frame as data. Block 18 also includes a hash digest of block 16 and a hash digest of itself. The illustration of four blocks in GOP blockchain 10 is merely exemplary. GOP blockchain 10 may include any number of blocks needed to fully encompass all frames within a Group of Pictures. The blocks 12, 14, 16 and 18 in GOP 10 may be arranged in a "stored order" as shown in FIG. 10. The blocks 12, 14, 16 and 18 in GOP 10 may be arranged in a "display order" as shown in FIG. 11.

Figure 14:
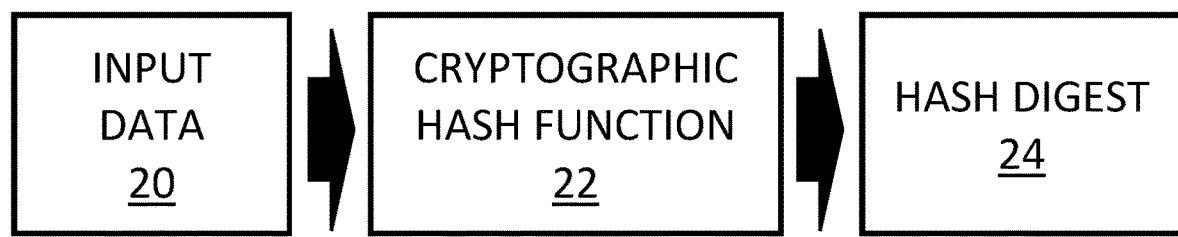
FIG. 14 illustrates a flowchart depicting a process for generating a hash digest from input data.

FIG. 14 illustrates a flowchart depicting a process for generating a hash digest from input data. In order to generate a hash digest 24, input data 20 is taken by an MXF file system manager, shown in FIG. 15 that may include a Helion Fast Hash Core ASIC, shown in FIG. 16. The MXF file system manager applies a cryptographic hash function 22 to the input data 20 to generate hash digest 24. The hash function 22 is typically the SHA-2 (Secure Hash Algorithm 2), which is a set of cryptographic hash functions designed by the United States National Security Agency (NSA). They are built using the Merkle-Damgård structure, from a one-way compression function itself built using the Davies-Meyer structure from a (classified) specialized block cipher. Cryptographic hash functions are mathematical operations run on digital data; by comparing the computed "hash" (the output from execution of the algorithm) to a known and expected hash value, a person can determine the data's integrity. For example, computing the hash of a downloaded file and comparing the result to a previously published hash result can show whether the download has been modified or tampered with. A key aspect of cryptographic hash functions is their collision resistance: nobody should be able to find two different input values that result in the same hash output. SHA-2 includes significant changes from its predecessor, SHA-1. The SHA-2 family includes six hash functions with digests (hash values) that are 224, 256, 384 or 512 bits: SHA-224, SHA-256, SHA-384, SHA-512, SHA-512/224, SHA-512/256. SHA-256 and SHA-512 are novel hash functions computed with 32-bit and 64-bit words, respectively. They use different shift amounts and additive constants, but their structures are otherwise virtually identical, differing only in the number of rounds. SHA-224 and SHA-384 are simply truncated versions of the first two, computed with different initial values. SHA-512/224 and SHA-512/256 are also truncated versions of SHA-512, but the initial values are generated using the method described in Federal Information Processing Standards (FIPS) PUB 180-4. SHA-2 was published in 2001 by the National Institute of Standards and Technology (NIST) a U.S. federal standard (FIPS). The SHA-2 family of algorithms are patented in U.S. Pat. No. 6,829,355, which is hereby incorporated by reference in its entirety. The United States has released this patent under a royalty-free license.

Figure 15:
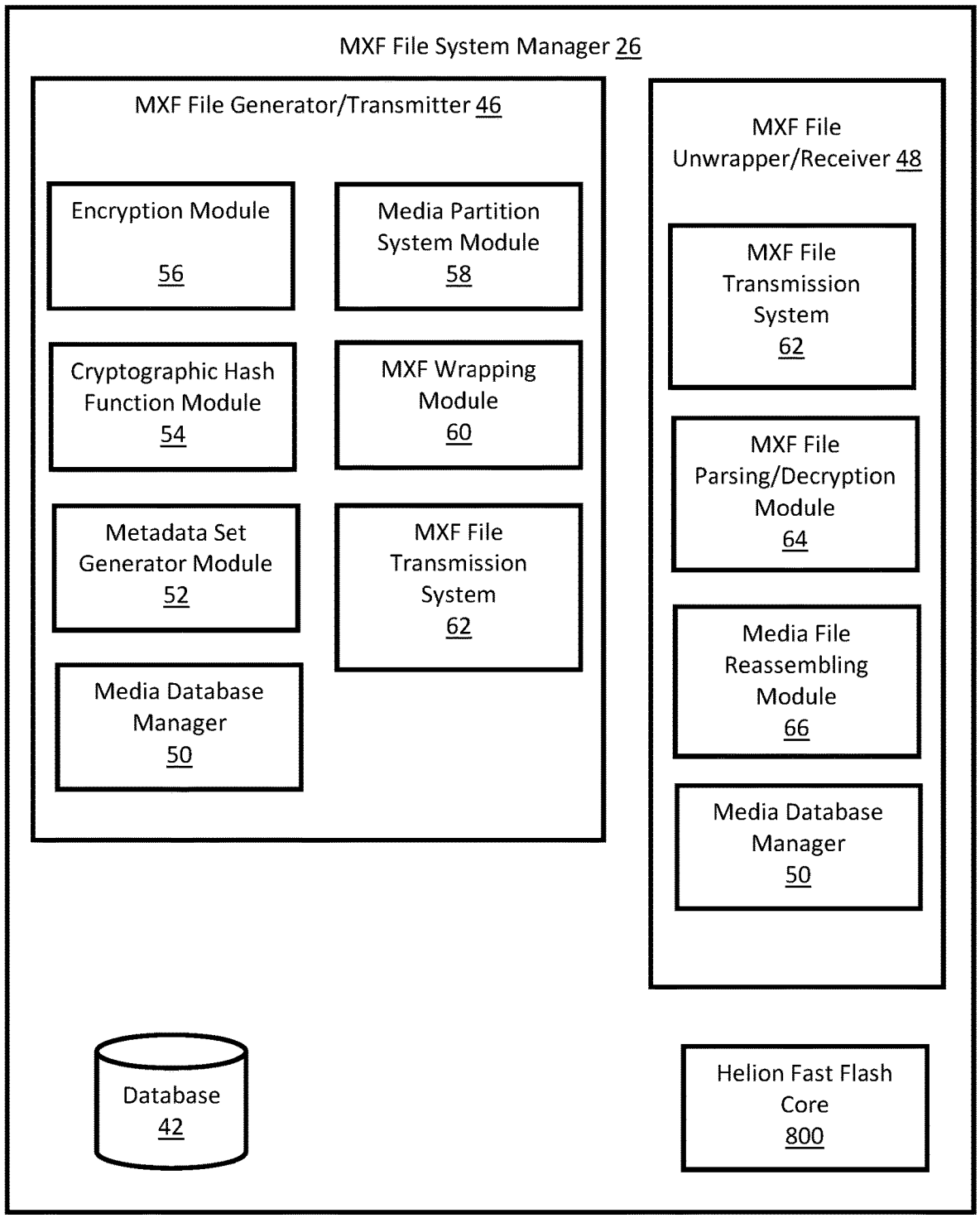
FIG. 15 illustrates a software block diagram of the system modules that make up the MXF file system manager.

FIG. 15 illustrates a software block diagram of the system modules that make up the MXF file system manager 26. System manager 26 includes a plurality of software modules along with a database storage device such as a magnetic hard drive, magnetic tape, optical drive, solid-state storage device, cloud-based data storage, or other data storage medium. System manager 26 also includes a processor to compute hash digests, such as the Helion Fast Hash Core ASIC (Application Specific Integrated Circuit) 800 discussed in FIG. 16. MXF file system manager 26 includes an MXF file generator/transmitter 46 that is configured to create an MXF file as described in FIGS. 1-7 and 10-12 according to the process outlined in FIG. 8. The MXF file generator/transmitter 46 stores a plurality of digital files on database storage device 42. These digital files may be media, such as music, movies, television shows, videos, photographs, or other media. These digital files may also be any sort of digital file such as software, database information, software code, executable instructions, or any other digital information. The digital files stored in database 42 are accessed and managed by media database manager 50. Media database manager 50 is a software program that stores, accesses, and manages all files on database device 42. Media database manager 50 may organize the digital files on database 42 according to a hierarchical database, a network database, a relational database, or an object-oriented database. The first step in generating an MXF file, as shown in FIG. 8, is to access the media file, or other digital file stored on database 42 with media database manager 50. Next, metadata set generator module 52 creates a set of metadata based on the media file. Metadata set generator module 52 creates system metadata pack 110, package metadata set 302, picture metadata 304, sound metadata set 306, data metadata set 308, and control data set 120. These metadata sets are created based upon the configuration of metadata set 300. After creating the metadata sets, MXF file generator/transmitter 46 utilizes cryptographic hash function module 54 to generate package blockchain hash digest 310, picture blockchain hash digest set 312, sound blockchain hash digest set 314, and data blockchain hash digest set 316. The picture blockchain hash digest set 312 may be based upon a Group Of Pictures in stored order as shown in FIG. 10, or a Group Of Pictures in display order, as shown in FIG. 11. An exemplary blockchain created by cryptographic hash function module 54 is shown in FIG. 13. Cryptographic hash function module 54 first generates the blockchain hash digests using, for example, a Helion Fast Hash Core 800 shown in FIG. 16, according to the process described in FIG. 14. After creating these blockchain hash digests, cryptographic hash function module 54 assembles the different blockchain hash digests into a digest set as described in FIG. 8. A blockchain hash digest set as an assembly of all blockchain hash digests for a particular aspect of the digital file accessed from database storage device 42. For example, picture blockchain hash digest set 312 includes all blockchain hash digests for the picture portion of the media file accessed from database 42. Next, media partition system module 58 may optionally partition the picture and sound streams as needed and shown in FIG. 7. Then MXF wrapping module 60 places the digital files stored in database 42 and places them into generic containers as shown in FIGS. 6 and 7. Then, the MXF wrapping module 60 creates a Material eXchange Format (MXF) File by wrapping the following items: system metadata pack 110, package metadata set 302, picture metadata 304, sound metadata set 306, data metadata set 308, and control data set 120; package blockchain hash digest 310, picture blockchain hash digest set 312, sound blockchain hash digest set 314, sound blockchain hash digest set 314, and data blockchain hash digest set 316; and the media files stored in generic containers 510, 520, and 530. MXF file generator/transmitter 46 may then transmit the Material eXchange Format (MXF) File from a sender node on a network to a receiver node on a network utilizing MXF file transmission system 62. The MXF file generator/transmitter 46 may transmit the Material eXchange Format (MXF) File across any form of digital transmission as shown in FIG. 17, such as satellite transmission, terrestrial wireless transmission, or transmission over optical or electrical cables through a network, such as a distributed network like the Internet. MXF file generator/transmitter 46 is located at all transmission nodes of a network that generate and send Material eXchange Format (MXF) Files, such a television stations, radio stations, distributed network-based media distribution outlets such as a Internet based media streaming service such as NETFLIX, iTUNES, or AMAZON PRIME VIDEO. MXF file system manager 26 also includes an MXF file parsing/decryption module 64 that allows for the decryption of the encrypted package, picture, sound, and data within the encrypted Material eXchange Format (MXF) File. MXF file parsing/decryption module 64 parses the encrypted package, picture, sound, and data from the Material eXchange Format (MXF) File for subsequent decryption.

MXF file system manager 26 may also include an MXF file unwrapper/receiver 48. MXF file unwrapper/receiver 48 is located at all receiver nodes that receive Material eXchange Format (MXF) Files, such as computer terminals, network television displays, or other network nodes that receive Material eXchange Format (MXF) Files. MXF file unwrapper/receiver 48 includes an MXF file transmission system that is configured to receive Material eXchange Format (MXF) Files across any digital communications link, such as a satellite communications link, terrestrial wireless communications link, or network communications link as shown in FIG. 17. Once MXF file unwrapper/receiver 48 receives a Material eXchange Format (MXF) File, MXF file parsing module 64 parses wrapped video and audio streams 500 to isolate system item 100 as detailed in FIG. 9. From system item 100, MXF file unwrapper/receiver 48 isolates system metadata pack 110; package (02h), picture (03h), sound (04h), and data (05h) metadata sets; control data set (06h); package (1×h), picture (2×h), sound (3×h), and data (4×h) blockchain hash digest sets, and thus package, picture, sound, and data blockchain hash digests. Next, media file reassembling module 66 takes all of the data, metadata, and media essence isolated from the Material eXchange Format (MXF) File by the MXF file unwrapper/receiver 48 and reassembles the original media file for display on a computer terminal, television, movie display device, or other form of media display. MXF file unwrapper/receiver 48 may also include a media database manager 50 that can store media files wrapped from a Material eXchange Format (MXF). For example, database device 42 may be a DVR, local storage drive, or a cloud-based storage device.

Figure 16:
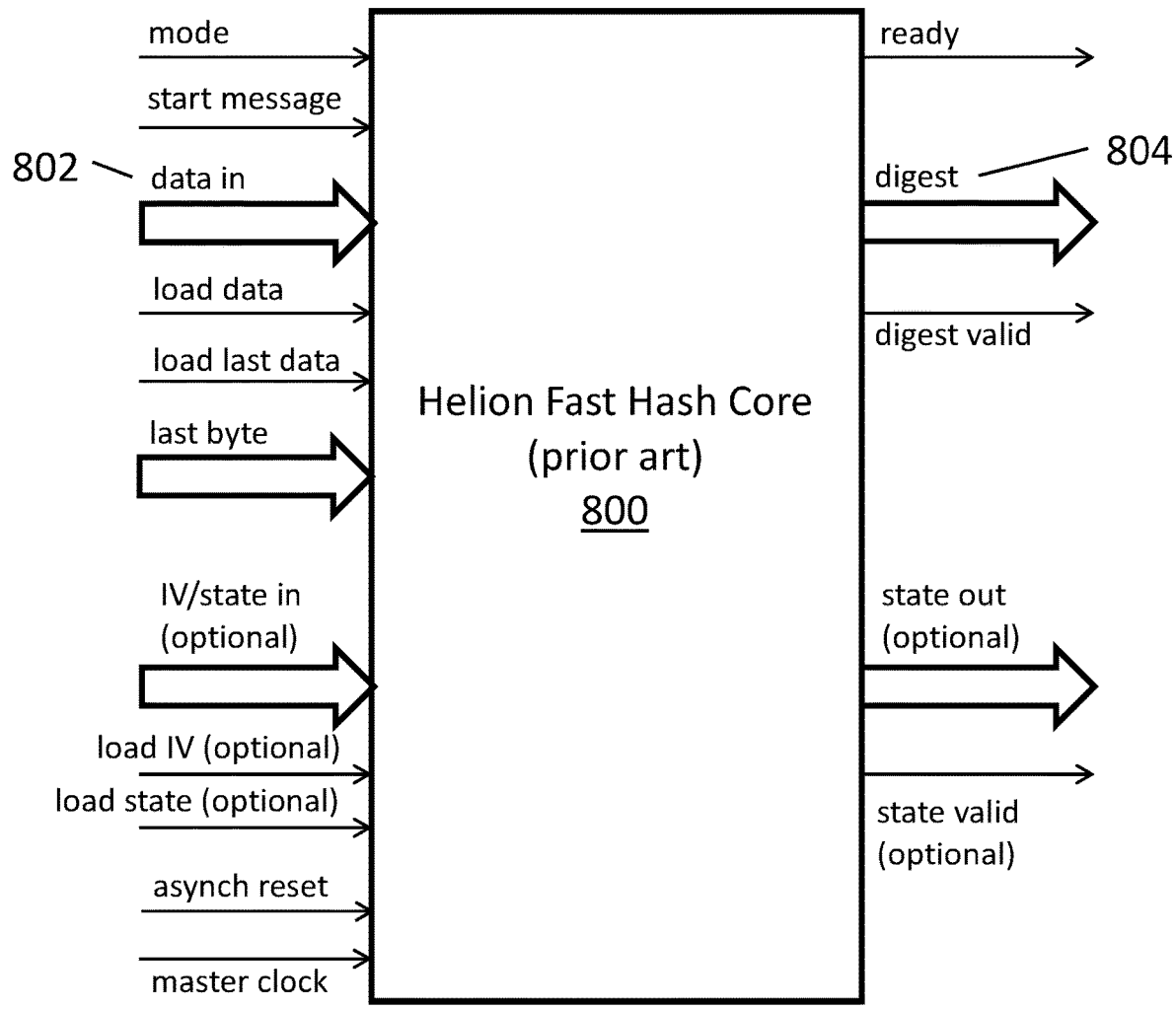
FIG. 16 illustrates a prior-art diagram of the Helion Fast Hash Core Application Specific Integrated Circuit (ASIC)
Figure 17:
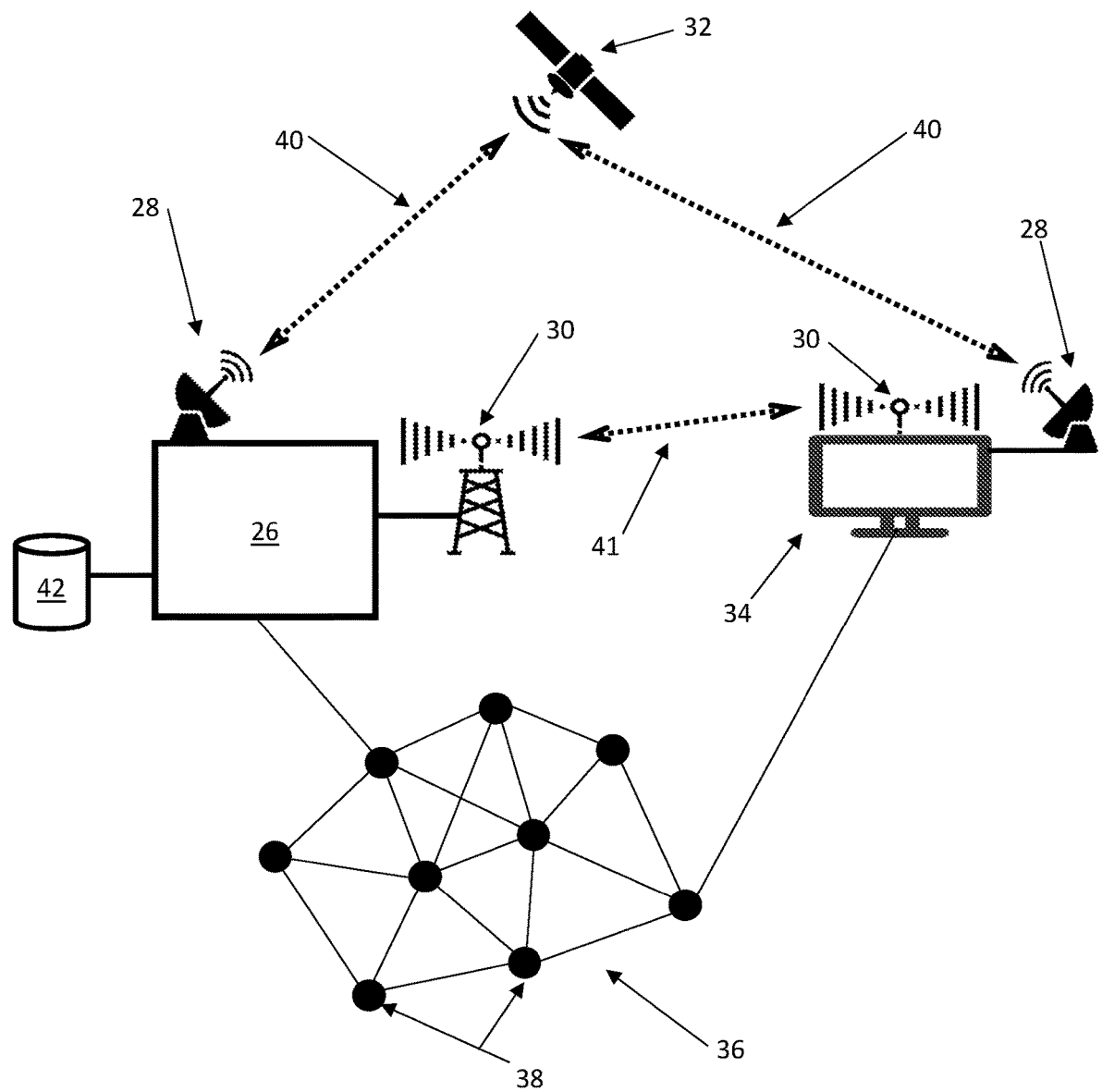
FIG. 17 illustrates an exemplary communications network for transmission of an electronic digital file and associated metadata via satellite communications links, wireless terrestrial communications links, and communications links provided by a distributed network.

In FIG. 16, is the Helion Fast Hash Core ASIC (Application Specific Integrated Circuit) 800 (prior art). Data is fed into this ASIC at 802 and the resulting Hash Digest output is 804. Such dedicated Hash Core ASICs have faster performance than software running in a computer memory under an operating system. It is hash digest 804 that is stored in the metadata values 334, 344, and 354 for package 310, picture 312, sound 314, and data 316 blockchain hash digest sets, respectively. Hash input 802 would be, for example, GOP I, P, B frames in stored order 900, GOP I, P, B frames in display order, 930, digital audio files, and data files. The code or instructions to execute processes 1000 and 2000 may be stored on a Hard Disk Drive (HDD); a Solid-State Drive (SSD); Electrically-Erasable, Programmable, Read-Only Memory (EEPROM); Write-Once, Read Mostly Memory (WORM); Random Access Memory (RAM); Compact Disk (CD); Digital Versatile Disk (DVD); Blu-Ray disc (BD); magnetic tape; a cloud; and the like.

FIG. 17 illustrates an exemplary communications network for transmission of an electronic digital file and associated metadata via satellite communications links, wireless terrestrial communications links, and communications links provided by a distributed network. An MXF file system manager 26 is shown residing on a sender node of a distributed network 36. The sender node may be a television station, network-based video streaming service, cable service provider, radio station, network-based radio streaming service, or any other form of digital media service provider. MXF file system manager 26 is coupled to a database storage device that may be local or cloud-based. The sender node supporting MXF file system manager 26 is coupled to a satellite transmission system 28 that may transmit signals bidirectionally across communications link 40 through a satellite 32 to a receiver node 34 that is depicted as having a conventional display device, such as a computer terminal, mobile electronic device, television, movie display, or other media display device. Receiver node 34 includes a satellite transmission system 28 that is capable of bidirectional communication with satellite 32 in order to receive the Material eXchange Format (MXF) File from the sender node 26. Sender node 26 is also coupled to a terrestrial wireless transmission antenna 30 that sends communications bidirectionally across a communications link 41 with a terrestrial wireless transmission antenna 30 located at receiver node 34 enabling the bidirectional transmission of Material eXchange Format (MXF) Files between sender node 26 and receiver node 34. Sender node 26 and receiver node 34 are also both coupled to a distributed network 36, such as the Internet, allowing for the bidirectional transmission of Material eXchange Format (MXF) Files between sender node 26 and receiver node 34.

Figure 18:
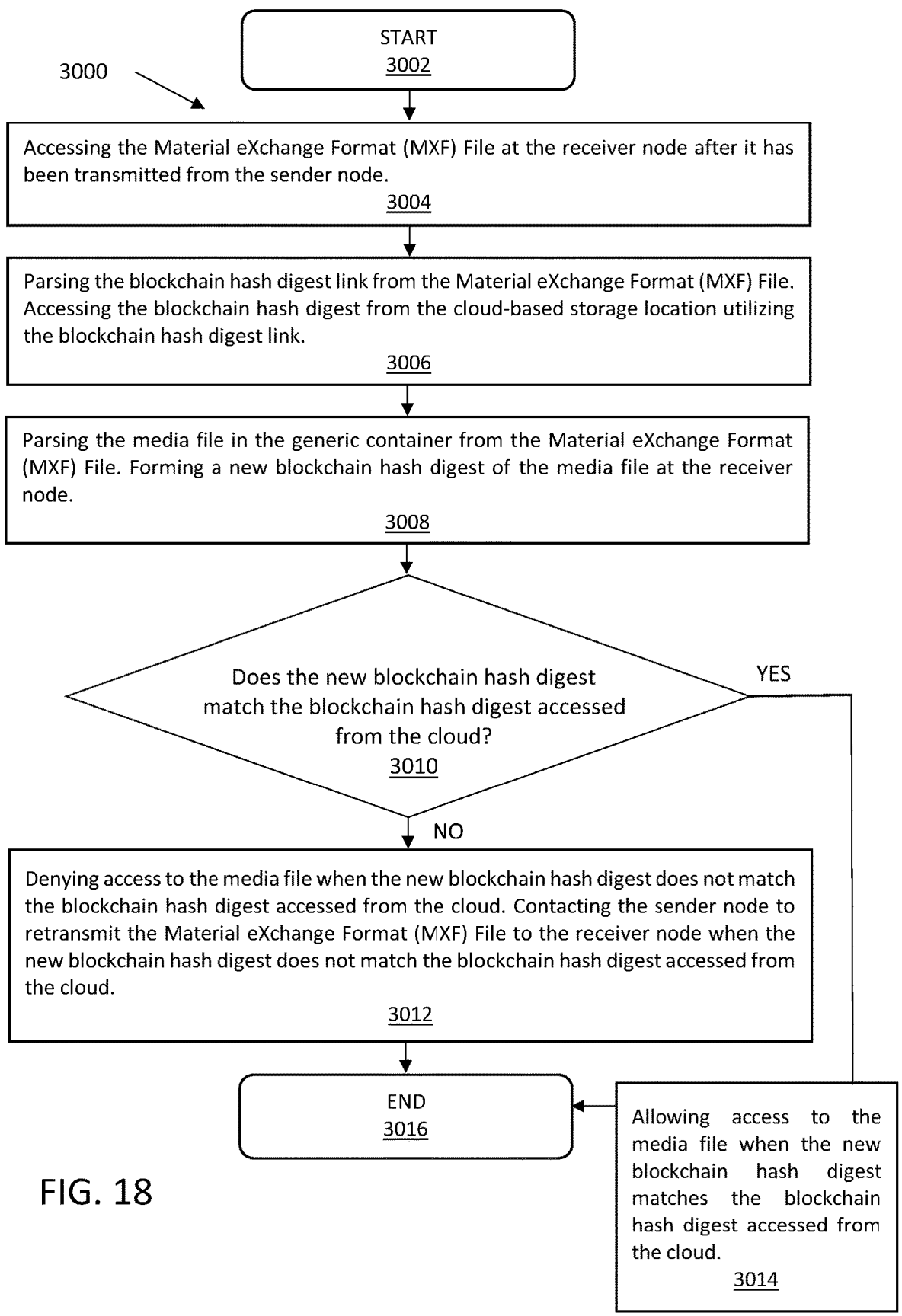
FIG. 18 illustrates a flowchart depicting a process for error checking the media file held in a generic container of a Material eXchange Format (MXF) File using a blockchain hash digest link connected to a blockchain hash digest stored in a cloud-based storage location.

FIG. 18 illustrates a flowchart 3000 depicting a process for error checking the media file held in a generic container of a Material eXchange Format (MXF) File using a blockchain hash digest link connected to a blockchain hash digest stored in a cloud-based storage location. The process begins with START 3002. In step 3004, the MXF file unwrapper/receiver 48 accesses the Material eXchange Format (MXF) File at the receiver node 34 after it has been transmitted from the sender node 26. In step 3006, the MXF file unwrapper/receiver 48 at the receiver node 34 parses the blockchain hash digest link from the Material eXchange Format (MXF) File and accesses the blockchain hash digest from the cloud-based storage location utilizing the blockchain hash digest link. In step 3008, the MXF file unwrapper/receiver 48 parses the media file in the generic container from the Material eXchange Format (MXF) File and forms a new blockchain hash digest of the media file at the receiver node. Then in step 3010, the MXF file unwrapper/receiver 48 at the receiver node 34 determines if the new blockchain hash digest matches the blockchain hash digest accessed from the cloud. If the new blockchain hash digest does match the blockchain hash digest accessed from the cloud, the MXF file unwrapper/receiver 48 allows access to the media file unwrapped from the Material eXchange Format (MXF) File in step 3014. If the new blockchain hash digest does not match the blockchain hash digest accessed from the cloud in step 3012, the MXF file unwrapper/receiver 48 denies access to the media file when the new blockchain hash digest does not match the blockchain hash digest accessed from the cloud. The MXF file unwrapper/receiver 48 then contacts the sender node to retransmit the Material eXchange Format (MXF) File to the receiver node when the new blockchain hash digest does not match the blockchain hash digest accessed from the cloud. The process ENDS with step 3016.

Figure 19:
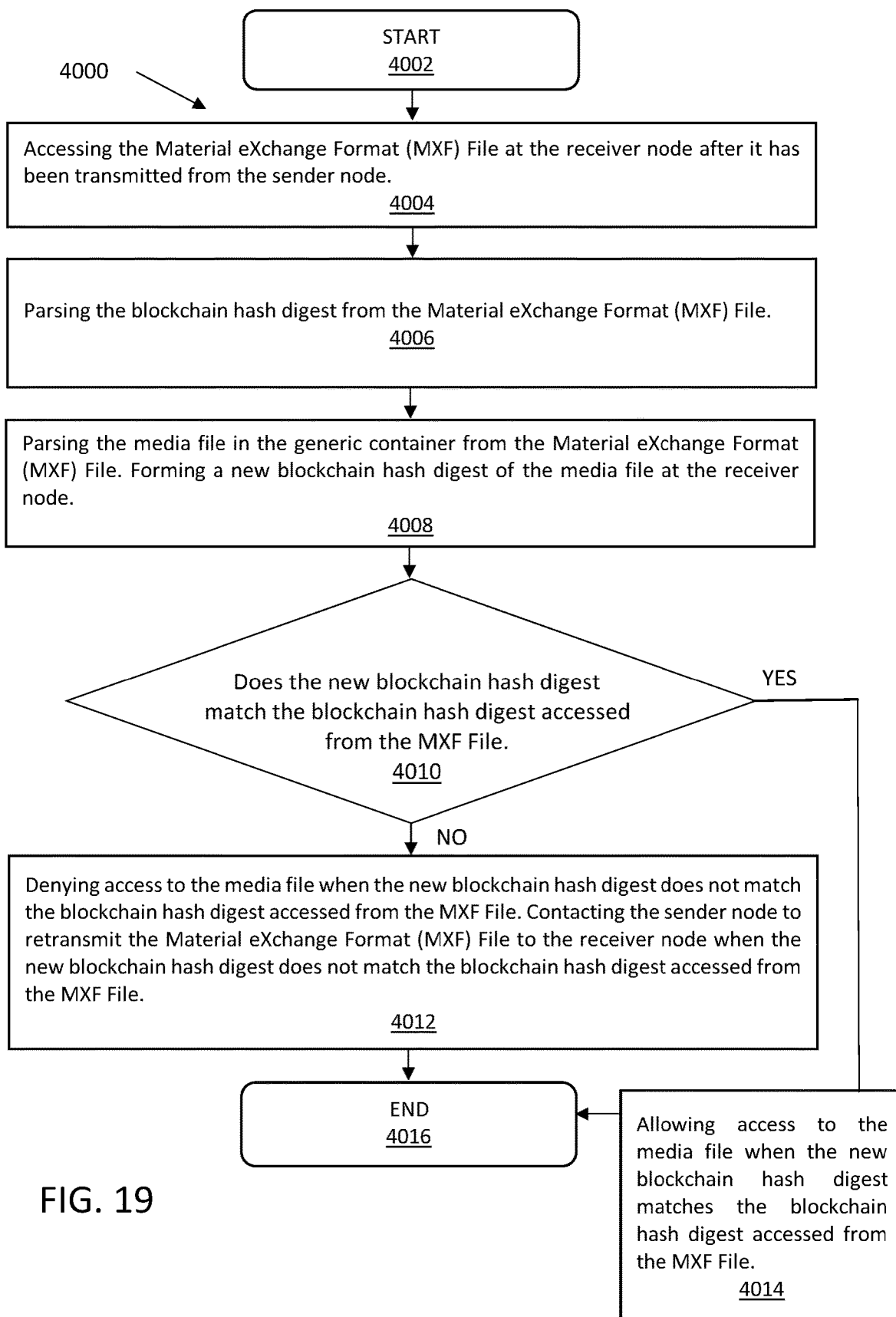
FIG. 19 illustrates a flowchart depicting a process for error checking the media file held in a generic container of a Material eXchange Format (MXF) File using a blockchain hash digest.

FIG. 19 illustrates a flowchart 4000 depicting a process for error checking the media file held in a generic container of a Material eXchange Format (MXF) File using a blockchain hash digest. The process begins with START 4002. In step 4004, the MXF file unwrapper/receiver 48 accesses the Material eXchange Format (MXF) File at the receiver node 34 after it has been transmitted from the sender node 26. In step 4006, the MXF file unwrapper/receiver 48 at the receiver node 34 parses the blockchain hash digest link from the Material eXchange Format (MXF) File and accesses the blockchain hash digest from the Material eXchange Format (MXF) File. In step 4008, the MXF file unwrapper/receiver 48 parses the media file in the generic container from the Material eXchange Format (MXF) File and forms a new blockchain hash digest of the media file at the receiver node. Then in step 4010, the MXF file unwrapper/receiver 48 at the receiver node 34 determines if the new blockchain hash digest matches the blockchain hash digest accessed from the Material eXchange Format (MXF) File. If the new blockchain hash digest does match the blockchain hash digest accessed from the cloud, the MXF file unwrapper/receiver 48 allows access to the media file unwrapped from the Material eXchange Format (MXF) File in step 4014. If the new blockchain hash digest does not match the blockchain hash digest accessed from the Material eXchange Format (MXF) File in step 4012, the MXF file unwrapper/receiver 48 denies access to the media file when the new blockchain hash digest does not match the blockchain hash digest accessed from the cloud. The MXF file unwrapper/receiver 48 then contacts the sender node to retransmit the Material eXchange Format (MXF) File to the receiver node when the new blockchain hash digest does not match the blockchain hash digest accessed from the the Material eXchange Format (MXF) File. The process ENDS with step 4016.

Figure 20:
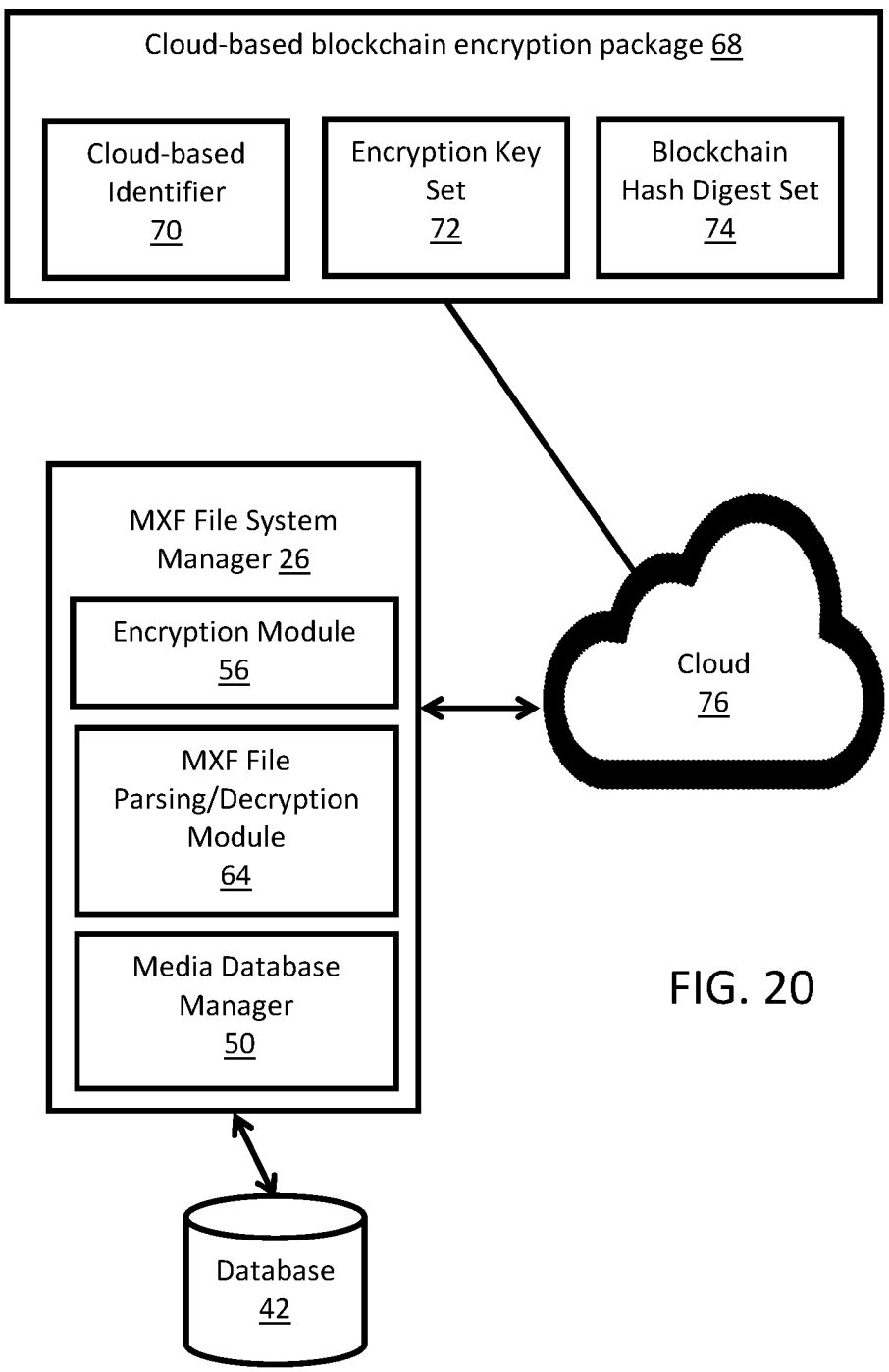
FIG. 20 depicts a block diagram of an MXF file system manager accessing a cloud-based storage location storing a cloud-based blockchain encryption package.

FIG. 20 depicts a block diagram of an MXF file system manager 26 accessing a cloud-based storage location 76 storing a cloud-based blockchain encryption package 68. MXF file system manager 26 includes an encryption module 56 that encrypts the package, picture, sound, and data. Encryption module 56 may use a variety of forms of encryption to encrypt the package, picture, sound, and data of the Material eXchange Format (MXF) File. These forms of encryption can include the use of public keys or private keys. Non-limiting examples of well-regarded asymmetric key techniques include: Diffie-Hellman key exchange protocol; DSS (Digital Signature Standard), which incorporates the Digital Signature Algorithm; ElGamal; Various elliptic curve techniques; Various password-authenticated key agreement techniques; Paillier cryptosystem; RSA encryption algorithm (PKCS#1); Cramer-Shoup cryptosystem; and YAK authenticated key agreement protocol. Encryption module 56 may access stored public or private keys from database 42 and use them to encrypt the package, picture, sound, and data of the Material eXchange Format (MXF) File. Encryption module 56 may encrypt the picture, sound, and data separately with different encryption keys. Encryption module 56 may then encrypt the package with a different encryption key as well. Encryption module 56 may then bundle all of these different encryption keys for the package, picture, sound, and data into an encryption key set 72. Alternatively, encryption module 56 may use a single encryption key to encrypt the media of the Material eXchange Format (MXF) File. MXF file system manager 26 wraps the encryption key set 72 together with the blockchain hash digest set 74 and the cloud-based identifier 70 into cloud-based blockchain encryption package 68. Blockchain hash digest set 74 is formed of the blockchain hash digests of the package, picture, sound, and data. Cloud-based identifier 70 allows the MXF file system manager 26 to correctly identify and access the cloud-based blockchain encryption package 68 in cloud 76 using the links stored in byte 15 illustrated in FIG. 12. MXF file system manager 26 also includes an MXF file parsing/decryption module 64 that allows for the decryption of the encrypted package, picture, sound, and data within the encrypted Material eXchange Format (MXF) File. MXF file parsing/decryption module 64 parses the encrypted package, picture, sound, and data from the Material eXchange Format (MXF) File for subsequent decryption.

Figure 21:
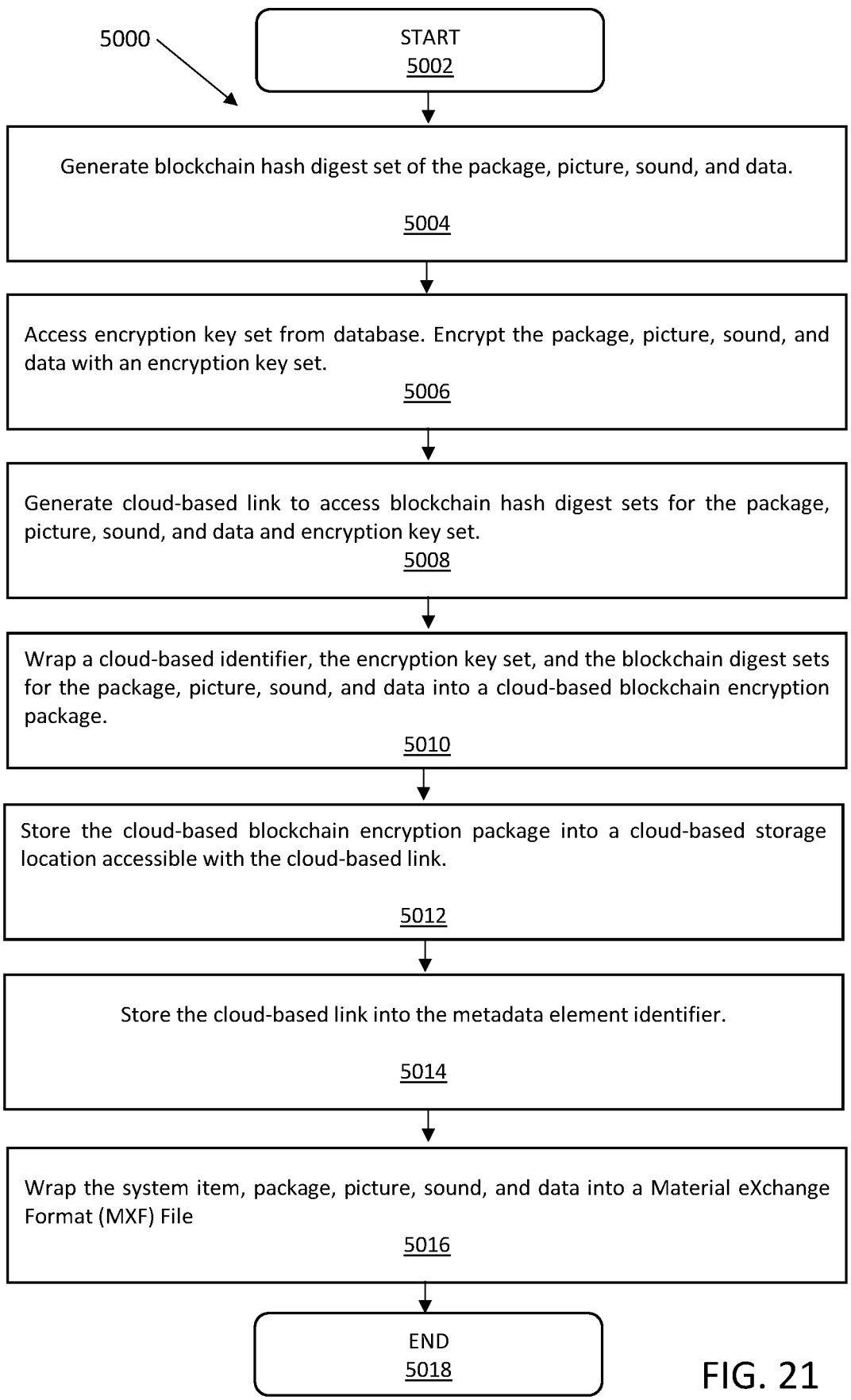
FIG. 21 illustrates a flowchart depicting a process for encrypting media within a Material eXchange Format (MXF) File and wrapping the encryption key set and blockchain hash digest set with a cloud-based identifier into a cloud-based blockchain encryption package that is stored in the cloud.

FIG. 21 illustrates a flowchart 5000 depicting a process for encrypting media within a Material eXchange Format (MXF) File and wrapping the encryption key set 72 and blockchain hash digest set 74 with a cloud-based identifier 70 into a cloud-based blockchain encryption package 68 that is stored in the cloud 76. The process begins with START 5002. In step 5004, the MXF file system manager 26 generates blockchain hash digest sets of the package, picture, sound, and data. These different blockchain hash digest sets are bundled into blockchain hash digest set 74. Then in step 5006, MXF file system manager 26 accesses an encryption key set from database 42. The encryption module 56 then encrypts the package, picture, sound, and data with the encryption key set. Next in step 5008, the MXF file system manager 26 generates a cloud-based link to access the blockchain hash digest sets for the package, picture, sound, and data as well as the encryption key set. Then in step 5010, the MXF file system manager 26 wraps the cloud-based identifier 70, encryption key set 72, and blockchain hash digest set 74 into cloud-based blockchain encryption package 68. Cloud-based identifier 70 uniquely identifies cloud-based blockchain encryption package 68 as being tied to a specific Material eXchange Format (MXF) File. Then in step 5012, MXF file system manager 26 stores the cloud-based blockchain encryption package 68 in a cloud-based storage device located in cloud 76, which is accessible using a link generated by the MXF file system manager 26. MXF Then in step 5014, MXF file system manager 26 stores the cloud-based link into metadata element identifier 710. Then in step 5016, the MXF file system manager 26 wraps system item 100 together with the package, picture, sound, and data into a Material eXchange Format (MXF) File. The process ENDS in step 5018.

Figure 22:
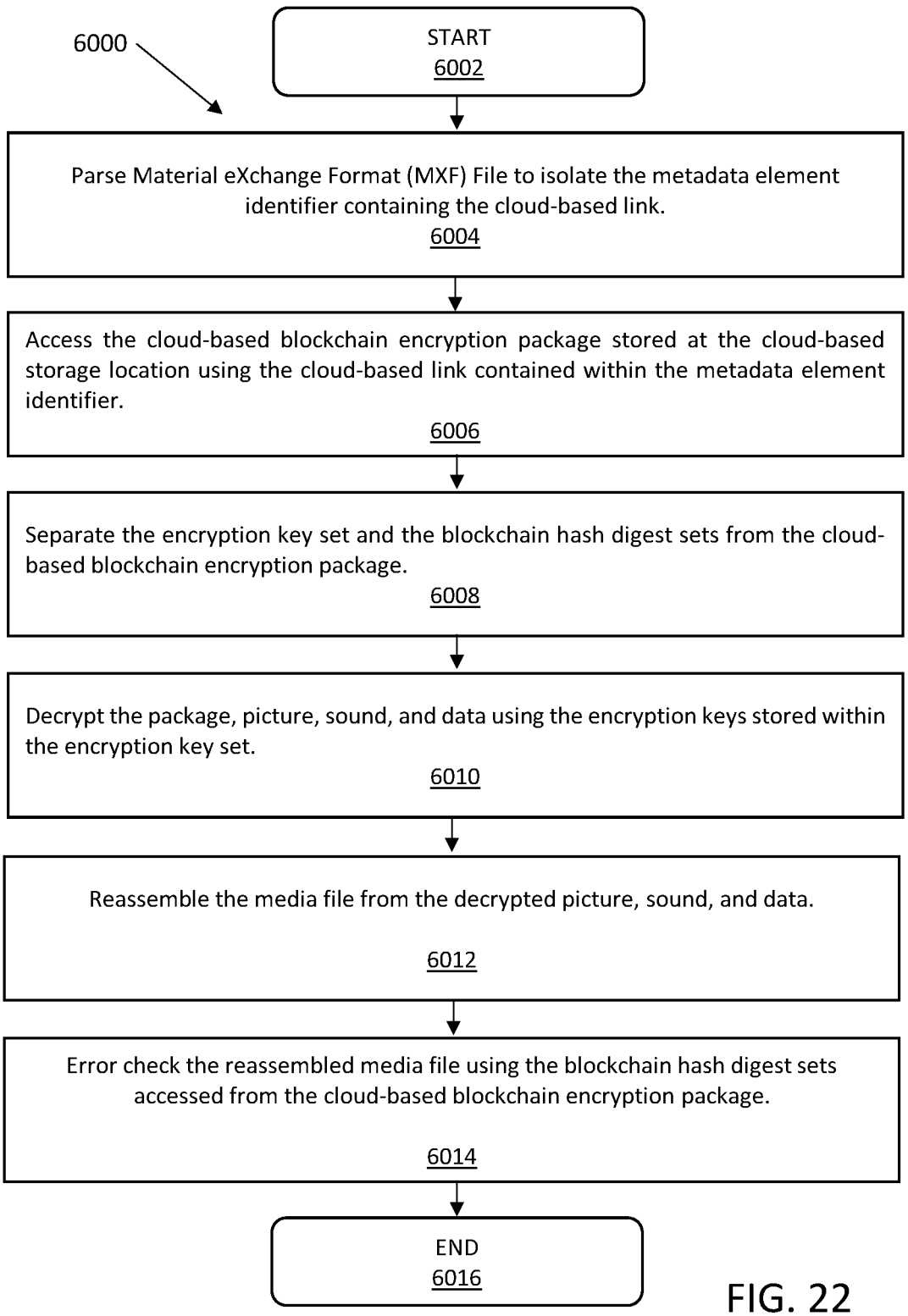
FIG. 22 illustrates a flowchart depicting a process for accessing a cloud-based blockchain encryption package that is stored in the cloud and using it to decrypt the picture, sound, and data within the Material eXchange Format (MXF) File and error checking the picture, sound, and data with the blockchain hash digest sets.

FIG. 22 illustrates a flowchart 6000 depicting a process for accessing a cloud-based blockchain encryption package 68 that is stored in the cloud 76 and using it to decrypt the picture, sound, and data within the Material eXchange Format (MXF) File and error checking the picture, sound, and data with the blockchain hash digest sets 74. The process begins with START 6002. Next in step 6004, the MXF file system manager 26 parses the Material eXchange Format (MXF) File to isolate the metadata element identifier containing the cloud-based link. Then in step 6006, the MXF file system 26 accesses the cloud-based blockchain encryption package 68 stored at the cloud-based storage location in cloud 76 using the cloud-based link contained within the metadata element identifier 710. Next in step 6008, the MXF file system manager 26 separates the encryption key set 72 and the blockchain hash digest sets 74 from the cloud-based blockchain encryption package 68. Then in step 6010, the MXF file system manager 26 decrypts the package, picture, sound, and data using the encryption keys stored within the encryption key set 72. Then in step 6012, the MXF file system manager 26 reassembles the media file from the decrypted picture, sound, and data. Next in step 6014, the MXF file system manager 26 error checks the reassembled media file using the blockchain hash digest sets 74 accessed from the cloud-based blockchain encryption package 68 per the process outlined in FIG. 18. The process then ENDS in step 6016.

While the invention has been shown and described with reference to a particular embodiment thereof, it will be understood to those skilled in the art, that various changes in form and details may be made therein without departing from the spirit and scope of the invention. For example, the "hearing" terms of sound and audio are generally synonymous. The visual term picture may be inclusive of both one or more images as well as a video stream.

The invention claimed is:

1. A non-transitory computer tangible medium containing instructions for storing blockchain information on a digital media file within a Material eXchange Format (MXF) digital file, comprising: accessing the digital media file that is stored within a blockchain that includes a blockchain hash digest based on the digital media file; containing the digital media file within a Material eXchange Format (MXF) generic container; and wrapping the Material eXchange Format (MXF) generic container with a system item that contains blockchain hash digest information based on the digital media file, thereby forming the Material eXchange Format (MXF) digital file wherein within the system item the blockchain hash digest information is identified by a registry designator separate from a registry designator for metadata.

2. The non transitory computer tangible medium containing instructions for storing blockchain information on the digital media file within the Material eXchange Format (MXF) digital file of claim 1, wherein the blockchain hash digest information is the blockchain hash digest, or the blockchain hash digest information is a link to a cloud-based storage location that stores the blockchain hash digest.

3. The non transitory computer tangible medium containing instructions for storing blockchain information on the digital media file within the Material eXchange Format (MXF) digital file of claim 1, wherein the digital media file is a video file formed of a Group Of Pictures (GOP) having I, P and B-frames, wherein the blockchain hash digest is formed from the frames of the Group of Pictures in a particular order selected from a group consisting of having the I, P and B-frames in a display order, the I, P and B-frames in a stored order, and based upon the I-frames only, wherein the I, P and B-frames are stored within blockchain blocks of the blockchain.

4. The non transitory computer tangible medium containing instructions for storing blockchain information on the digital media file within the Material eXchange Format (MXF) digital file of claim 1, wherein the system item is a Serial Data Transport Interface-Content Package (SDTI-CP) compatible system item.

5. The non transitory computer tangible medium containing instructions for storing blockchain information on the digital media file within the Material eXchange Format (MXF) digital file of claim 1, wherein the integrity of the digital media file is verified by extracting the digital media file from the generic container and creating a new blockchain hash digest of the digital media file and comparing it to the blockchain hash digest information contained within the system item.

6. The non transitory computer tangible medium containing instructions for storing blockchain information on the digital media file within the Material eXchange Format (MXF) digital file of claim 5, wherein a request for retransmission of the Material eXchange Format (MXF) digital file is made when the new blockchain hash digest does not match the blockchain hash digest information extracted from the Material eXchange Format (MXF) digital file, wherein access to Material eXchange Format (MXF) digital file is allowed when the new blockchain hash digest does match the blockchain hash digest information extracted from the Material eXchange Format (MXF) digital file.

7. The non transitory computer tangible medium containing instructions for storing blockchain information on the digital media file within the Material eXchange Format (MXF) digital file of claim 4, wherein the digital media file is encrypted with an encryption key that is stored in a cloud-based storage location that is accessible with a link stored in the SDTI-CP compatible system item.

8. The non transitory computer tangible medium containing instructions for storing blockchain information on the digital media file within the Material eXchange Format (MXF) digital file of claim 1, wherein the digital media file is partitioned within the generic container.

9. A non-transitory computer tangible medium containing instructions for storing blockchain information on a digital media file within a Material eXchange Format (MXF) digital file, comprising: accessing the digital media file that is stored within a blockchain that includes a blockchain hash digest based on the digital media file; containing the digital media file within a Material eXchange Format (MXF) generic container; and wrapping the Material eXchange Format (MXF) generic container with a system item that contains blockchain hash digest information based on the digital media file thereby forming the Material eXchange Format (MXF) digital file, wherein within the system item separate metadata element identifiers distinguish the blockchain hash digest from other metadata within the same registry designator.

10. The non transitory computer tangible medium containing instructions for storing blockchain information on the digital media file within the Material eXchange Format (MXF) digital file of claim 9, wherein the blockchain hash digest information is the blockchain hash digest, or the blockchain hash digest information is a link to a cloud-based storage location that stores the blockchain hash digest.

11. The non transitory computer tangible medium containing instructions for storing blockchain information on the digital media file within the Material eXchange Format (MXF) digital file of claim 9, wherein the digital media file is a media file formed of a Group Of Pictures (GOP) having I, P and B-frames, wherein the blockchain hash digest is formed from the frames of the Group of Pictures in a particular 5order selected from a group consisting of having the I, P and B-frames in a display order, the I, P and B-frames in a stored order, and based upon the I-frames only, wherein the I, P and B- frames are stored within blockchain blocks of the blockchain.

12. The non transitory computer tangible medium containing instructions for storing blockchain information on the digital media file within the Material eXchange Format (MXF) digital file of claim 9, wherein the system item is a Serial Data Transport Interface - Content Package (SDTI-CP) compatible system item.

13. The non transitory computer tangible medium containing instructions for storing blockchain information on the digital media file within the Material eXchange Format (MXF) digital file of claim 9, wherein the integrity of the digital media file is verified by extracting the digital media file from the generic container and creating a new blockchain hash digest of the digital media file and comparing it to the blockchain hash digest information transmitted contained in the system item.

14. The non transitory computer tangible medium containing instructions for storing blockchain information on the digital media file within the Material eXchange Format (MXF) digital media file of claim 13, wherein a request for retransmission of the Material eXchange Format (MXF) digital file is made when the new blockchain hash digest does not match the blockchain hash digest information extracted from the Material eXchange Format (MXF) digital file, wherein access to Material eXchange Format (MXF) digital file is allowed when the new blockchain hash digest does match the blockchain hash digest information extracted from the Material eXchange Format (MXF) digital file.

15. The non transitory computer tangible medium containing instructions for storing blockchain information on the digital media file within the Material eXchange Format (MXF) digital file of claim 12, wherein the digital media file is encrypted with an encryption key that is stored in a cloud-based storage location that is accessible with a link stored in the SDTI-CP compatible system item.

16. The non transitory computer tangible medium containing instructions for storing blockchain information on the digital media file within the Material eXchange Format (MXF) digital file of claim 9, wherein the digital media file is partitioned within the generic container.

17. A computer readable storage device containing a blockchain method for storing blockchain information on a digital medial file within a Material eXchange Format (MXF) digital file, comprising: accessing the digital media file that is stored within a blockchain that includes a blockchain hash digest based on the digital media file; containing the digital media file within a Material eXchange Format (MXF) generic container; and wrapping the Material eXchange Format (MXF) generic container with a system item that contains the blockchain hash digest, thereby forming the Material eXchange Format (MXF) digital file, wherein within the system item separate metadata element identifiers distinguish the blockchain hash from metadata within the same registry designator, or within the system item the blockchain hash digest is identified by a registry designator separate from a registry designator for metadata.

18. The blockchain method of claim 17, wherein the system item is a Serial Data Transport Interface-Content Package (SDTI-CP) compatible system item.

19. The blockchain method of claim 17, wherein the integrity of the digital media file is verified by extracting the digital media file from the generic container and creating a new blockchain hash digest of the digital media file and comparing it to the blockchain hash digest contained within the system item.

20. The blockchain method of claim 17, wherein a request for retransmission of the Material eXchange Format (MXF) digital media file is made when the new blockchain hash digest does not match the blockchain hash digest information extracted from the Material eXchange Format (MXF) digital media file, wherein access to Material eXchange Format (MXF) digital media file is allowed when the new blockchain hash digest does match the blockchain hash digest information extracted from the Material eXchange Format (MXF) digital media file.

* * * * *